United States Patent
Yi et al.

(10) Patent No.: US 11,012,204 B2
(45) Date of Patent: May 18, 2021

(54) COMMUNICATION METHOD OF USING FULL DUPLEX IN NR

(71) Applicant: LG Electronics Inc., Seoul (KR)

(72) Inventors: Yunjung Yi, Seoul (KR); Kijun Kim, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 16/064,937

(22) PCT Filed: Jun. 2, 2017

(86) PCT No.: PCT/KR2017/005811
§ 371 (c)(1),
(2) Date: Jun. 21, 2018

(87) PCT Pub. No.: WO2017/213386
PCT Pub. Date: Dec. 14, 2017

(65) Prior Publication Data
US 2019/0089502 A1 Mar. 21, 2019

Related U.S. Application Data

(60) Provisional application No. 62/347,599, filed on Jun. 8, 2016, provisional application No. 62/362,603, filed on Jul. 15, 2016, provisional application No. 62/373,961, filed on Aug. 11, 2016.

(51) Int. Cl.
*H04L 5/14* (2006.01)
*H04W 72/12* (2009.01)
(Continued)

(52) U.S. Cl.
CPC .......... *H04L 5/0041* (2013.01); *H04L 5/0037* (2013.01); *H04L 5/0053* (2013.01);
(Continued)

(58) Field of Classification Search
CPC ..... H04L 5/0041; H04L 27/2646; H04L 5/14; H04L 5/0053; H04W 72/1226; H04W 16/14
See application file for complete search history.

(56) References Cited

U.S. PATENT DOCUMENTS

2013/0094432 A1  4/2013  Cai
2013/0223294 A1  8/2013  Karjalainen
(Continued)

OTHER PUBLICATIONS

LG Electronics, "Consideration of Flexible and Full duplex operation in NR design," 3GPP TSG RAN WG1 Meeting #85, R1-164562, May 23-27, 2016, 6 pages.

*Primary Examiner* — Charles C Jiang
*Assistant Examiner* — Voster Preval
(74) *Attorney, Agent, or Firm* — Fish & Richardson P.C.

(57) ABSTRACT

The disclosure of the present invention proposes a communication method. The method may be performed by a wireless device and comprise: if a full duplex of a downlink (DL) reception and an uplink (UL) transmission is configured in an uplink carrier spectrum including a DL portion and a UL portion, considering that the DL portion in the uplink carrier spectrum is configured as protected DL portion for another device configured with non full-duplex. Here, the protected DL portion may allow the device configured with a non full-duplex to perform a UL transmission in the protected DL portion at a low power. The DL portion and the UL portion may be flexibly configured in the uplink carrier spectrum.

8 Claims, 20 Drawing Sheets

(51) Int. Cl.
*H04W 16/14* (2009.01)
*H04L 5/00* (2006.01)
*H04W 72/04* (2009.01)
*H04L 27/26* (2006.01)

(52) U.S. Cl.
CPC ............ *H04L 5/14* (2013.01); *H04L 27/2607* (2013.01); *H04L 27/2646* (2013.01); *H04W 16/14* (2013.01); *H04W 72/0453* (2013.01); *H04W 72/1226* (2013.01); *Y02D 30/70* (2020.08)

(56) References Cited

U.S. PATENT DOCUMENTS

| | | | |
|---|---|---|---|
| 2013/0315109 A1* | 11/2013 | Raaf | H04B 7/15528 370/277 |
| 2013/0336178 A1 | 12/2013 | Tiirola | |
| 2014/0003301 A1* | 1/2014 | Madan | H04L 5/14 370/280 |
| 2014/0016541 A1* | 1/2014 | Kim | H04L 5/0044 370/315 |
| 2015/0103702 A1* | 4/2015 | Lahetkangas | H04L 5/0044 370/280 |
| 2015/0304096 A1* | 10/2015 | Sahlin | H04W 72/0446 370/280 |
| 2016/0127108 A1 | 5/2016 | Jindal | |
| 2017/0111160 A1* | 4/2017 | Chen | H04L 1/1812 |
| 2017/0163404 A1* | 6/2017 | Liu | H04W 72/042 |
| 2018/0192357 A1* | 7/2018 | Fodor | H04W 36/0055 |
| 2019/0165851 A1* | 5/2019 | Tiirola | H04B 7/155 |

* cited by examiner

[Fig. 1]
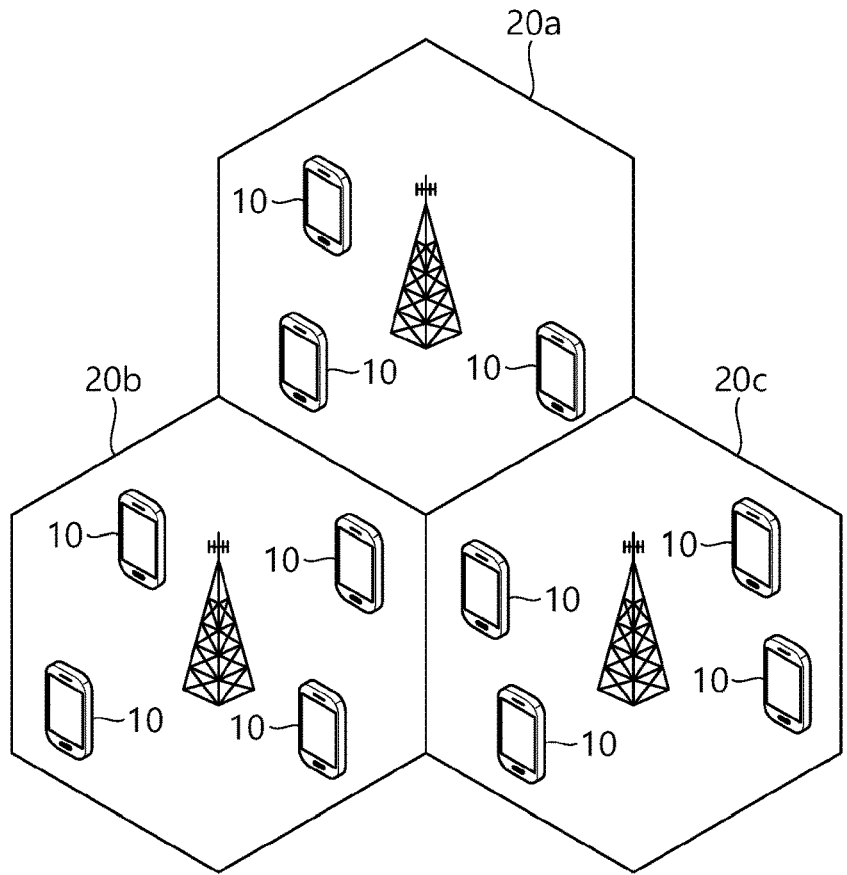
[Fig. 2]
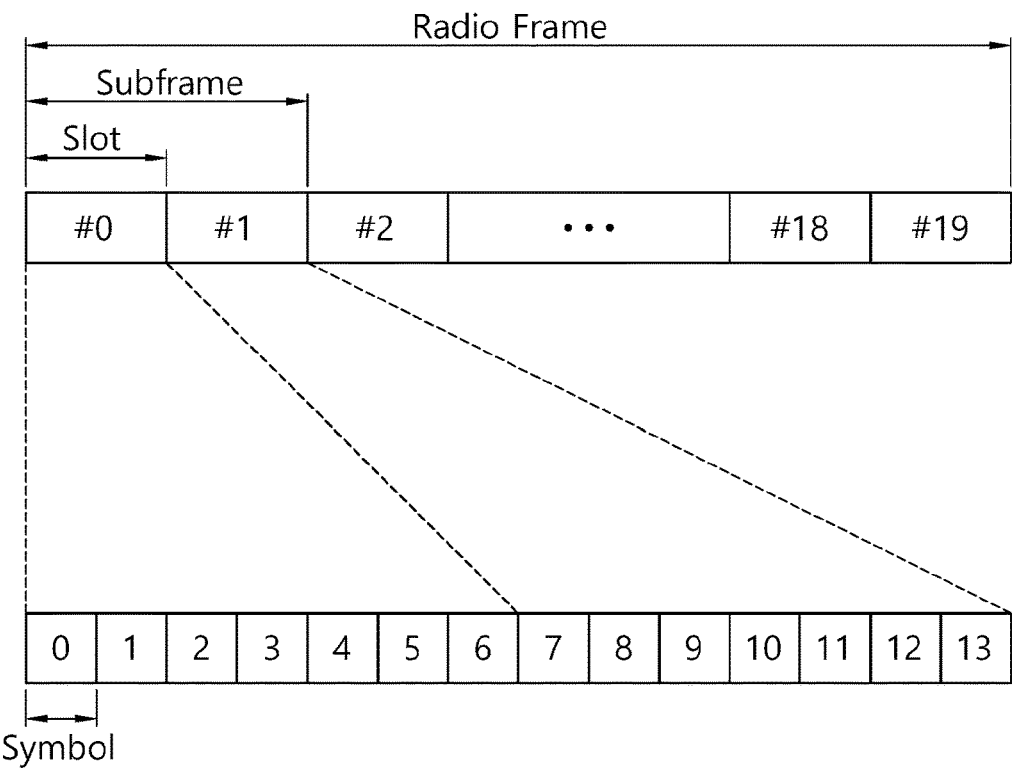

[Fig. 3]
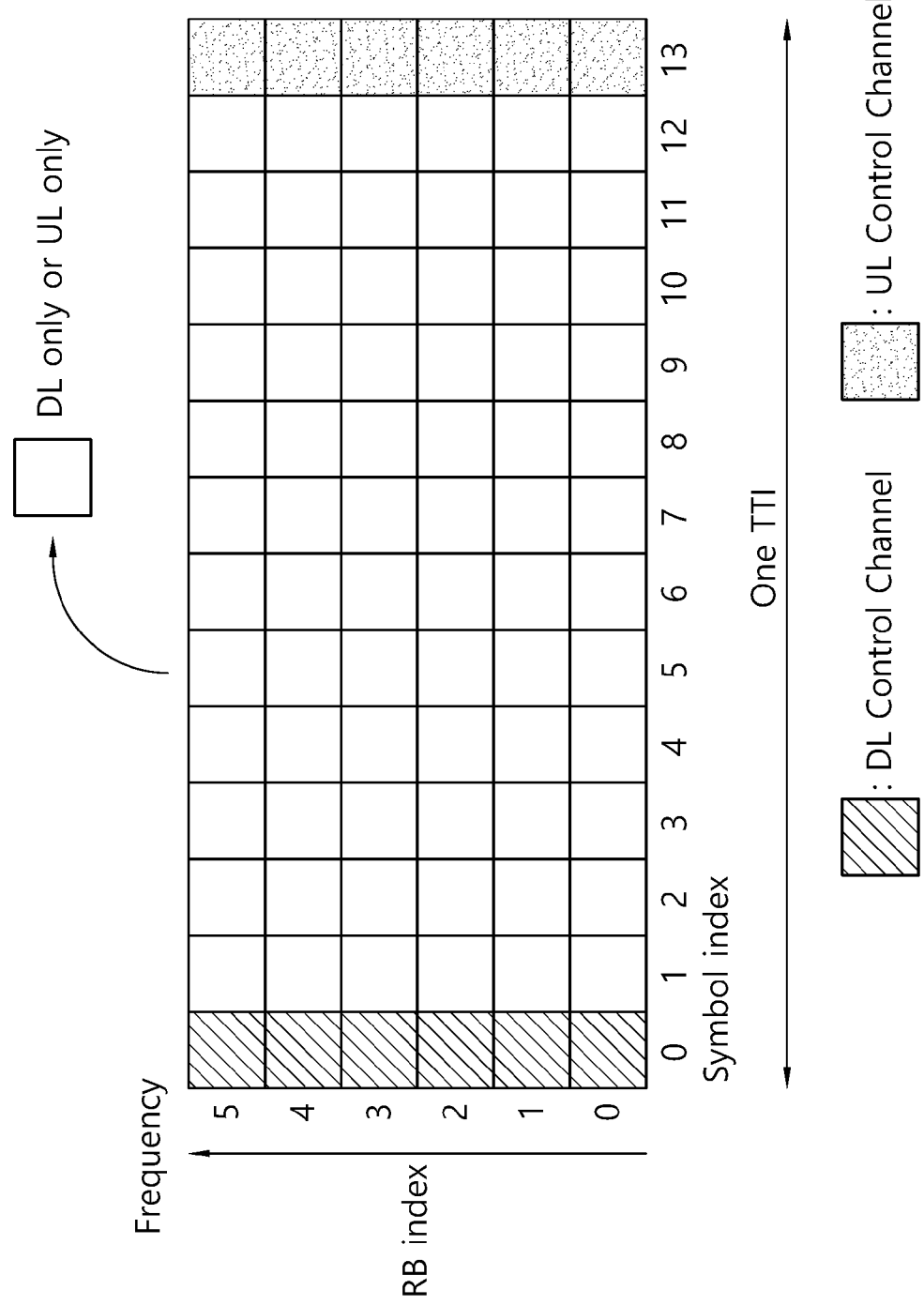

[Fig. 4]
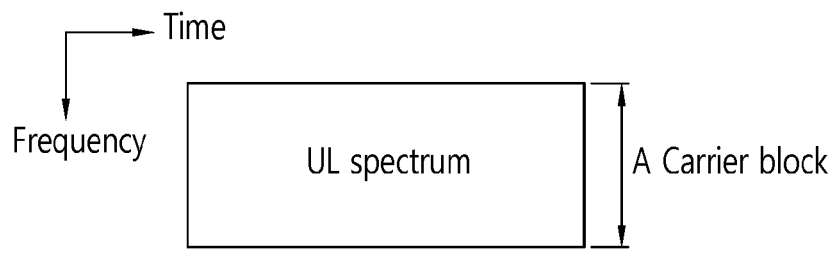
[Fig. 5]
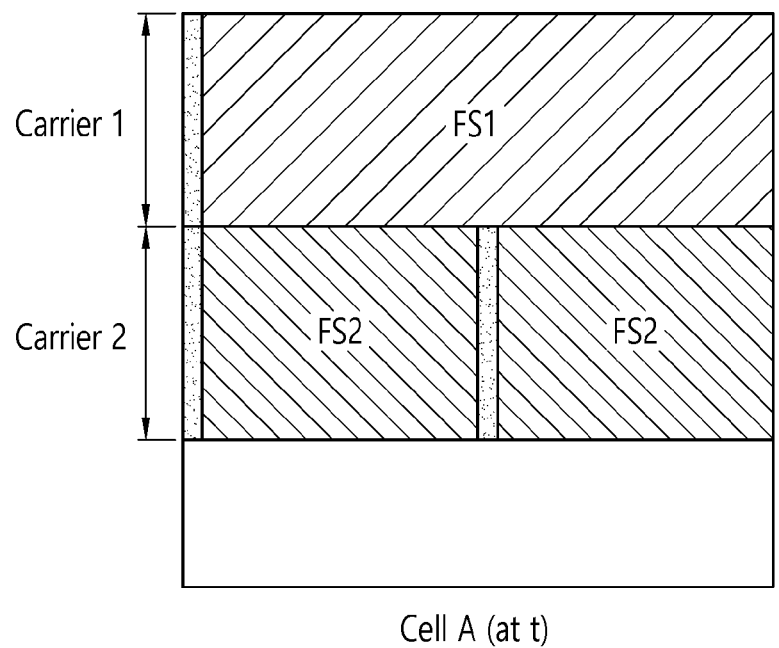

[Fig. 6]
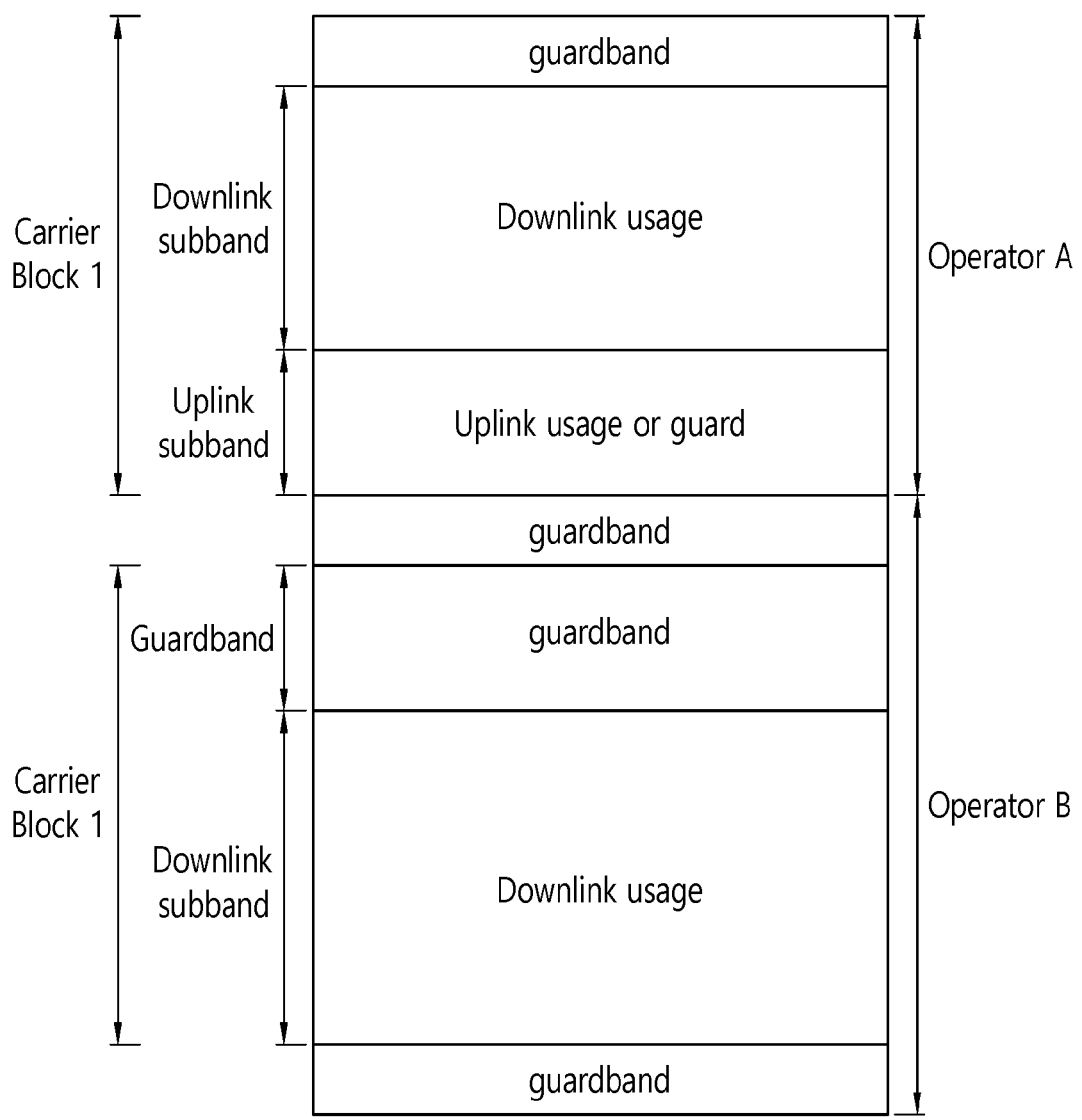

[Fig. 7]
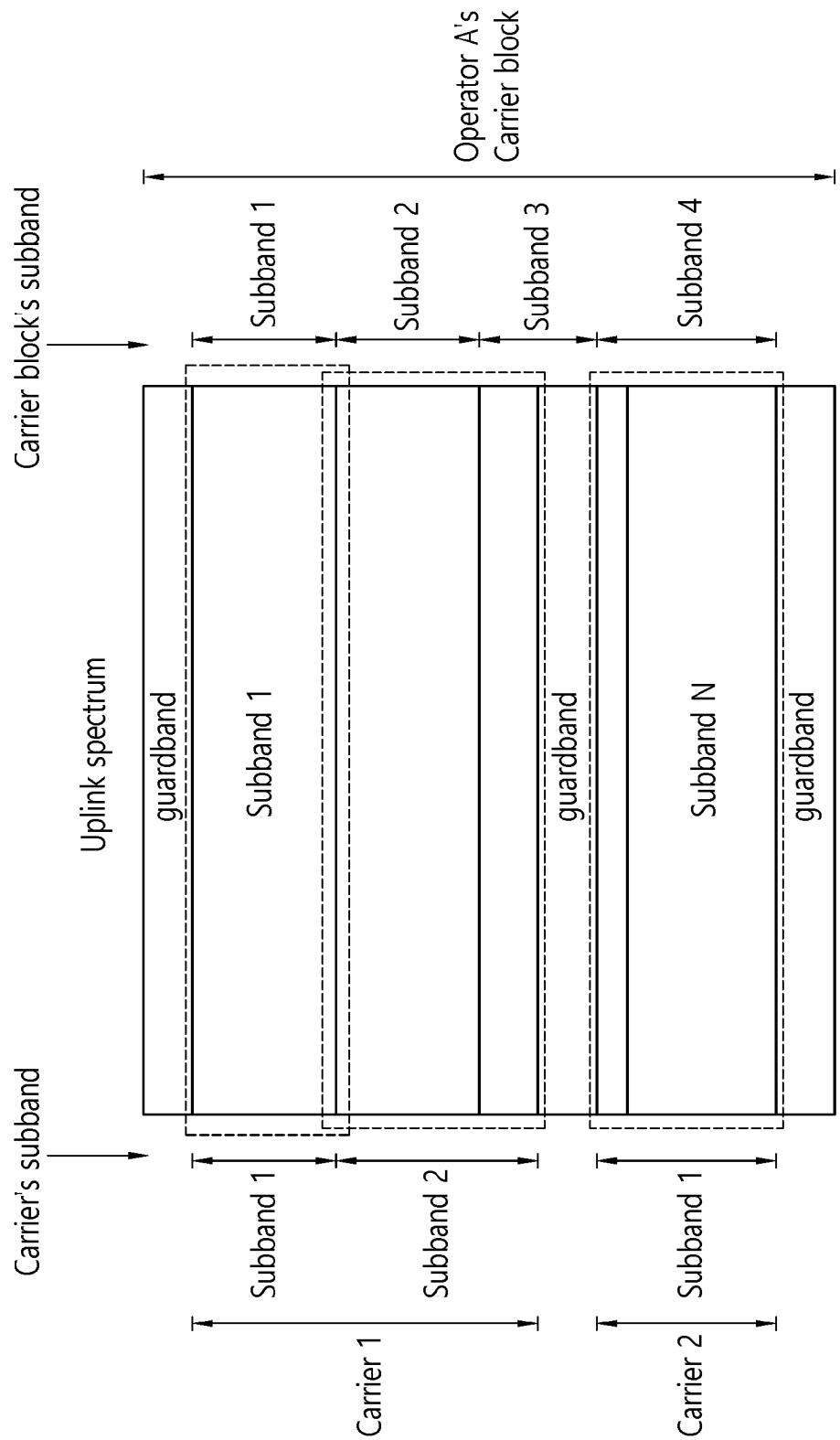

[Fig. 8]
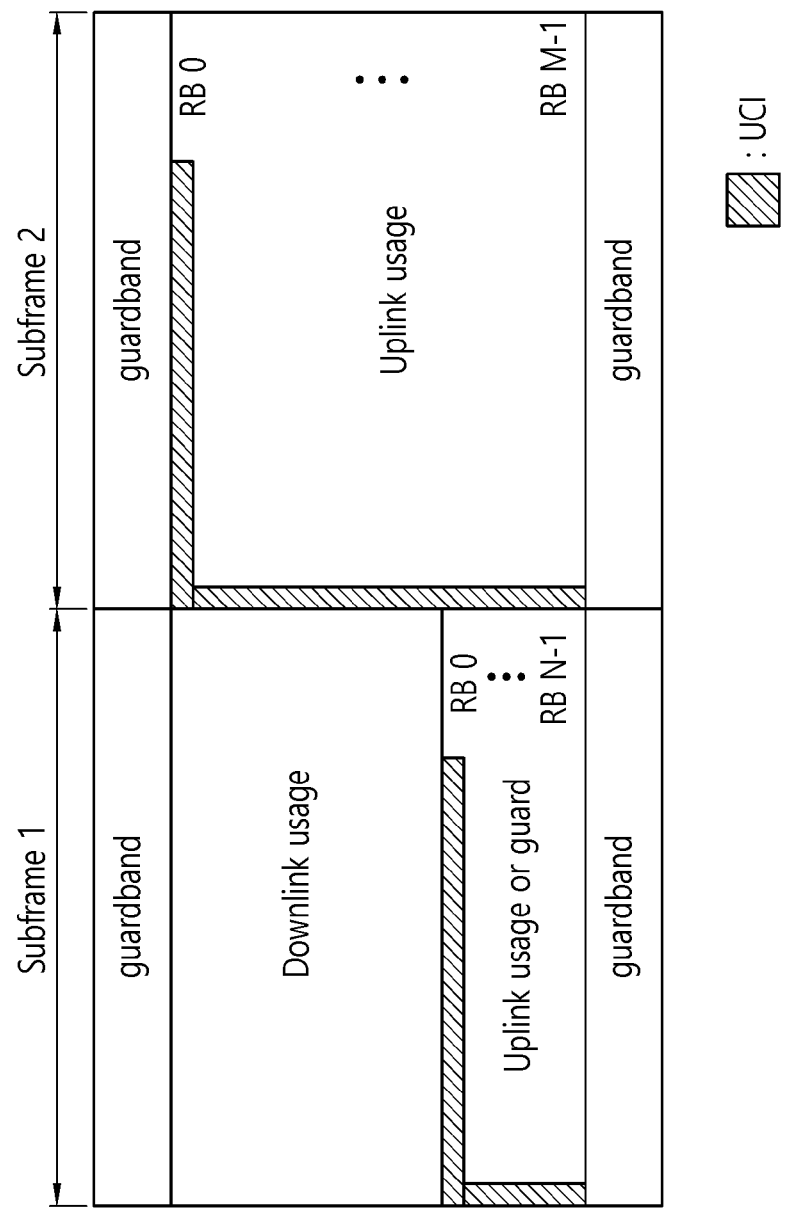

[Fig. 9]
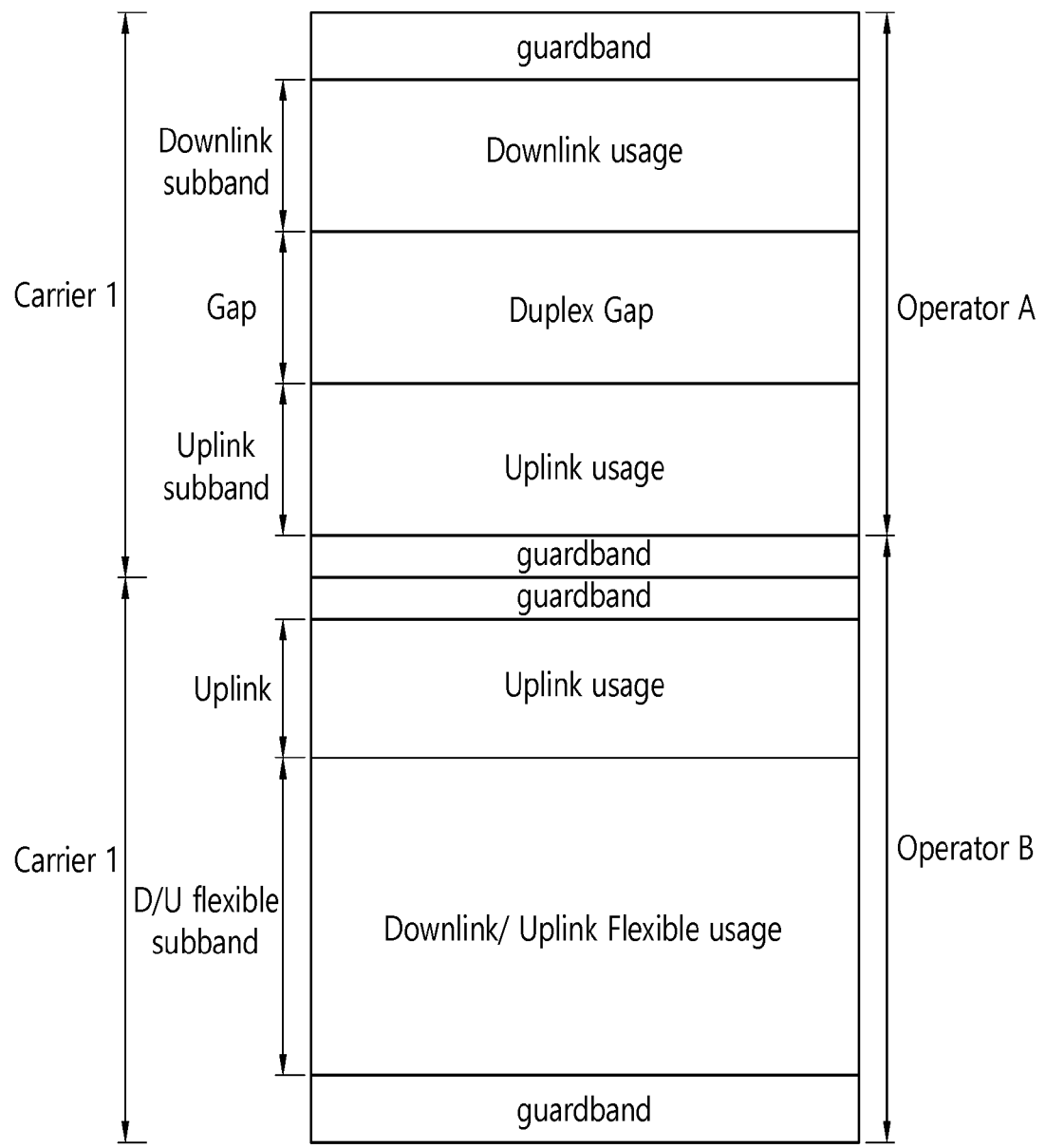

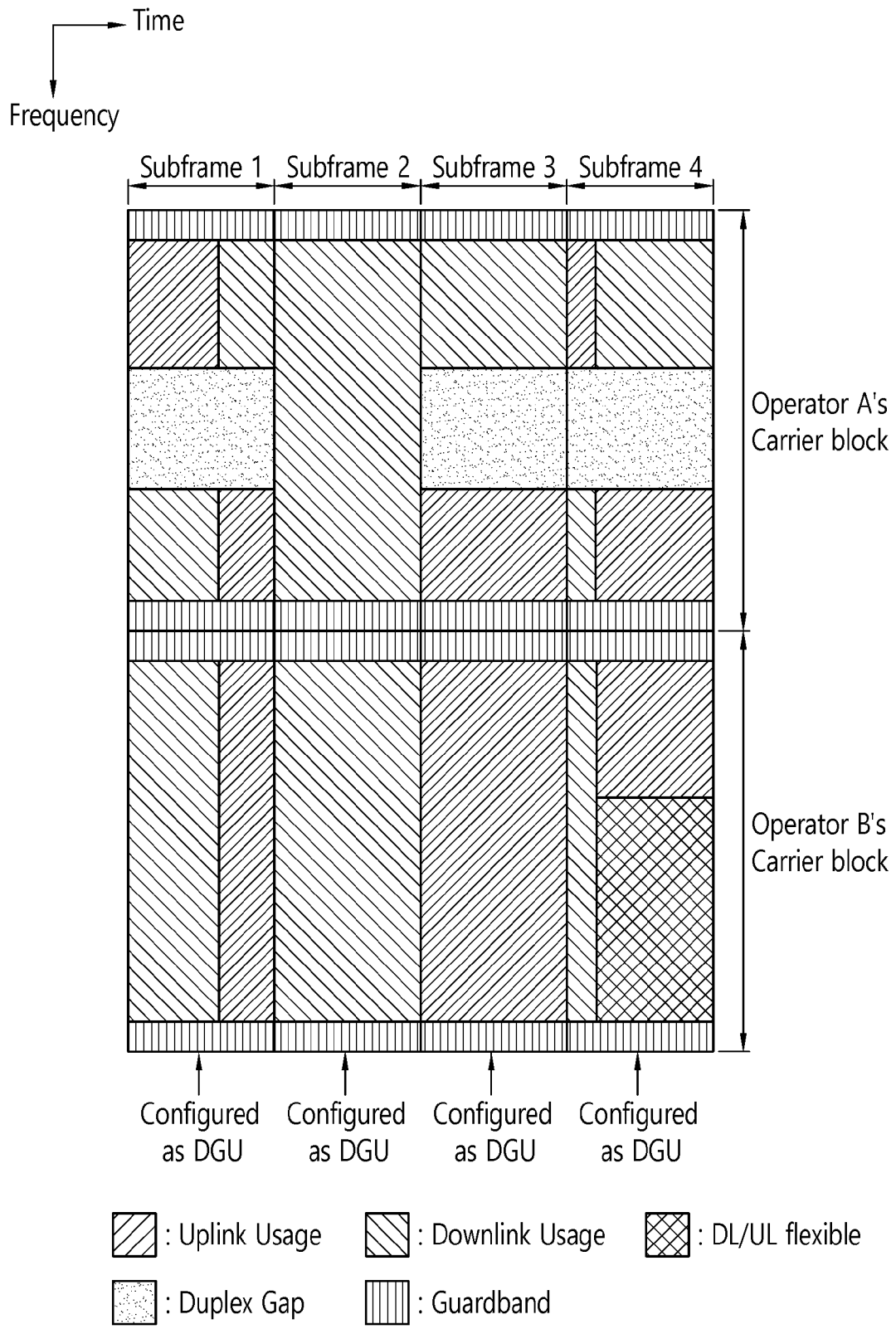
[Fig. 10]

[Fig. 11]
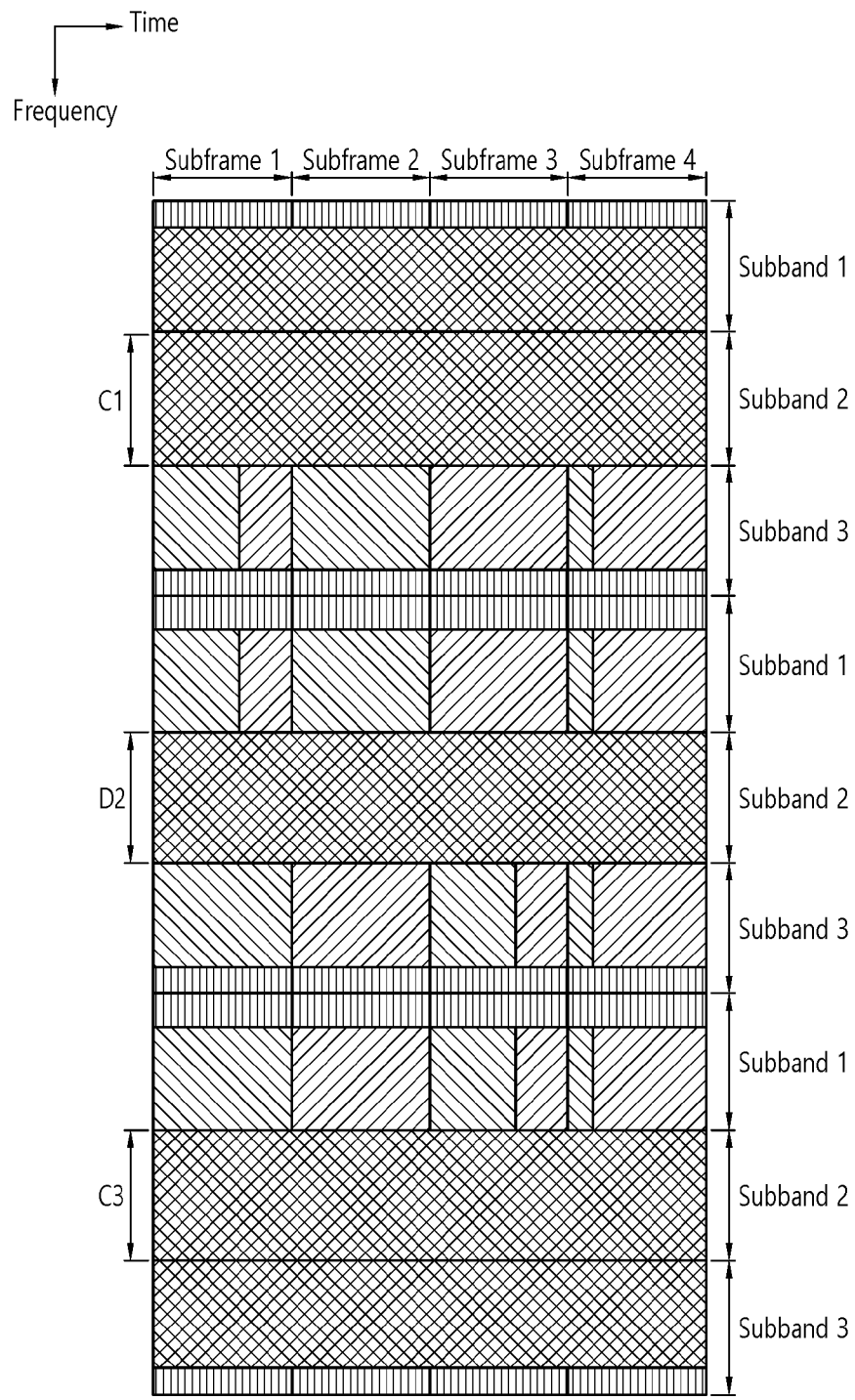

[Fig. 12]
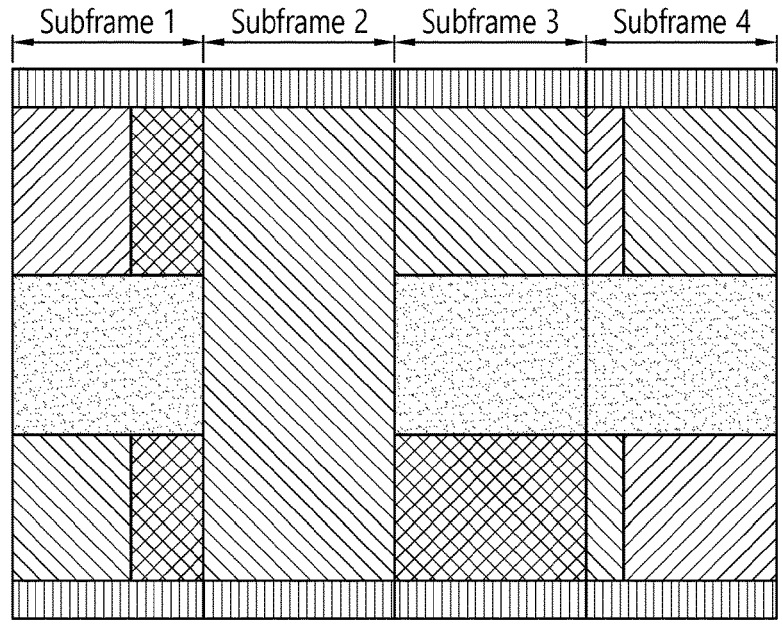
☒ : Uplink Usage  ☒ : Downlink Usage  ☒ : Sidelink usage
☒ : Duplex Gap  ☒ : Guardband
[Fig. 13]
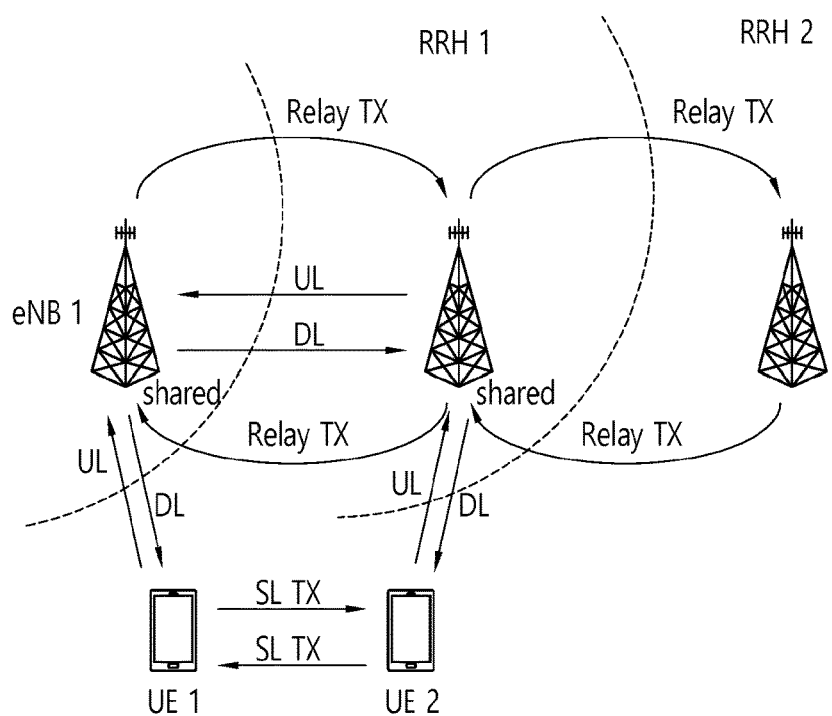

[Fig. 14]
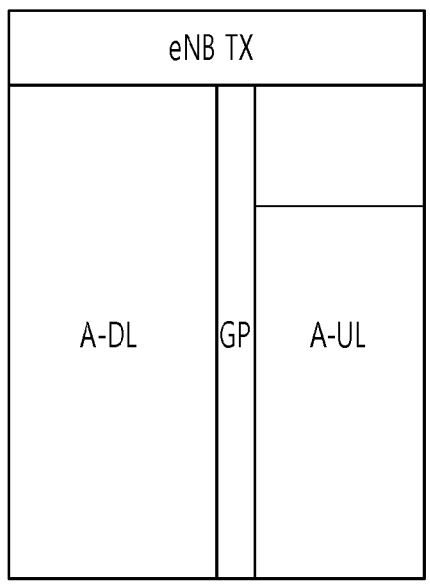
(1) Backhaul/ relay/ fronthaul TX+ access DL/UL
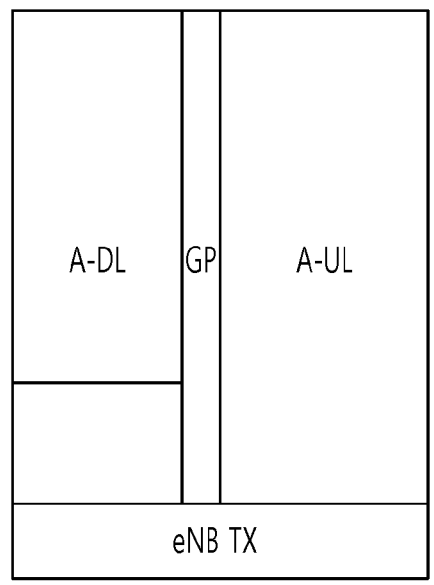
(2) Backhaul/ relay/ fronthaul RX+ access DL/UL
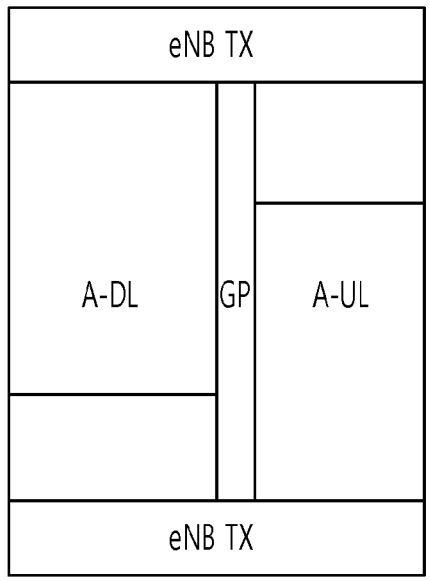
(3) Backhaul/ relay/ fronthaul RX/ TX+ access DL/UL
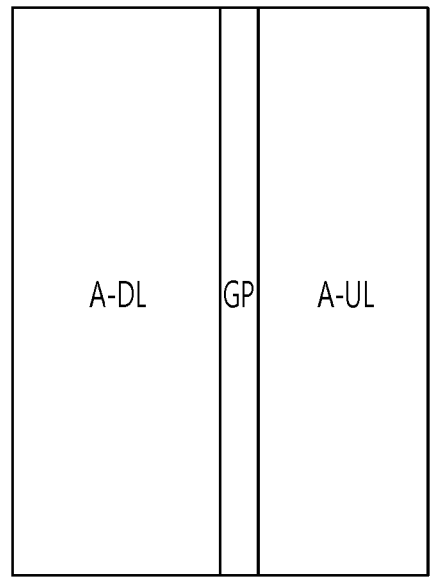
(4) Access DL/ UL

[Fig. 15]
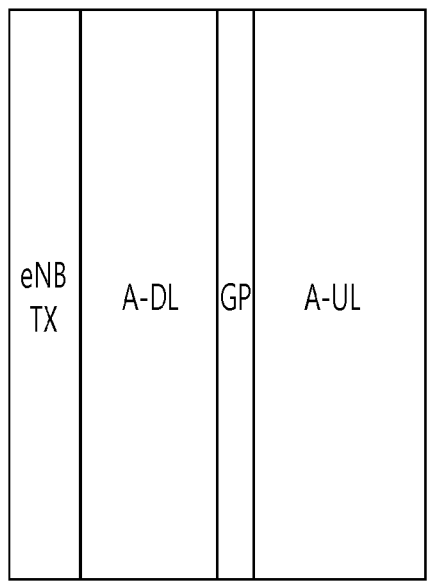
(1) Backhaul/ relay/ fronthaul TX+ access DL/UL
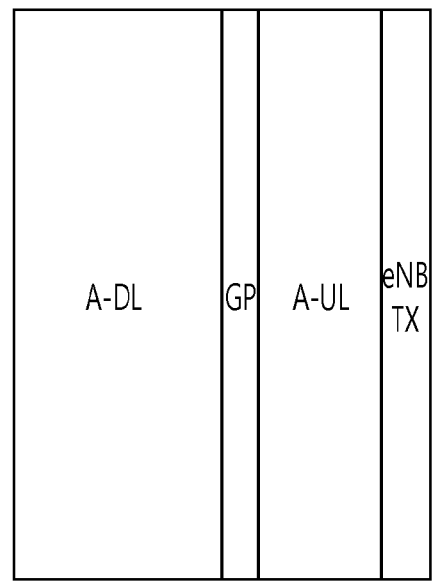
(2) Backhaul/ relay/ fronthaul RX+ access DL/UL
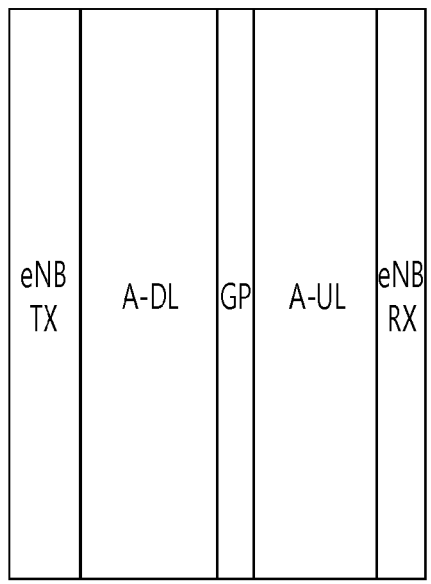
(3) Backhaul/ relay/ fronthaul RX/ TX+ access DL/UL
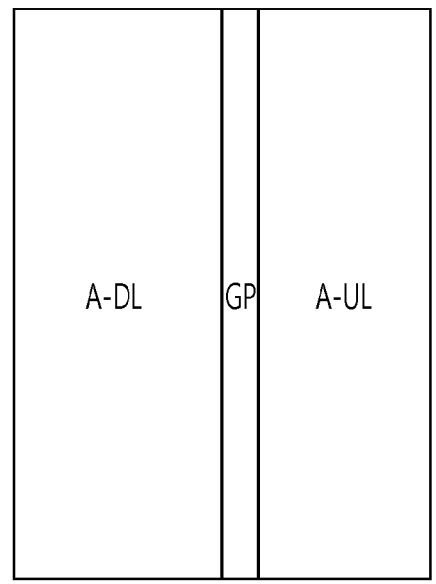
(4) Access DL/ UL

[Fig. 16]
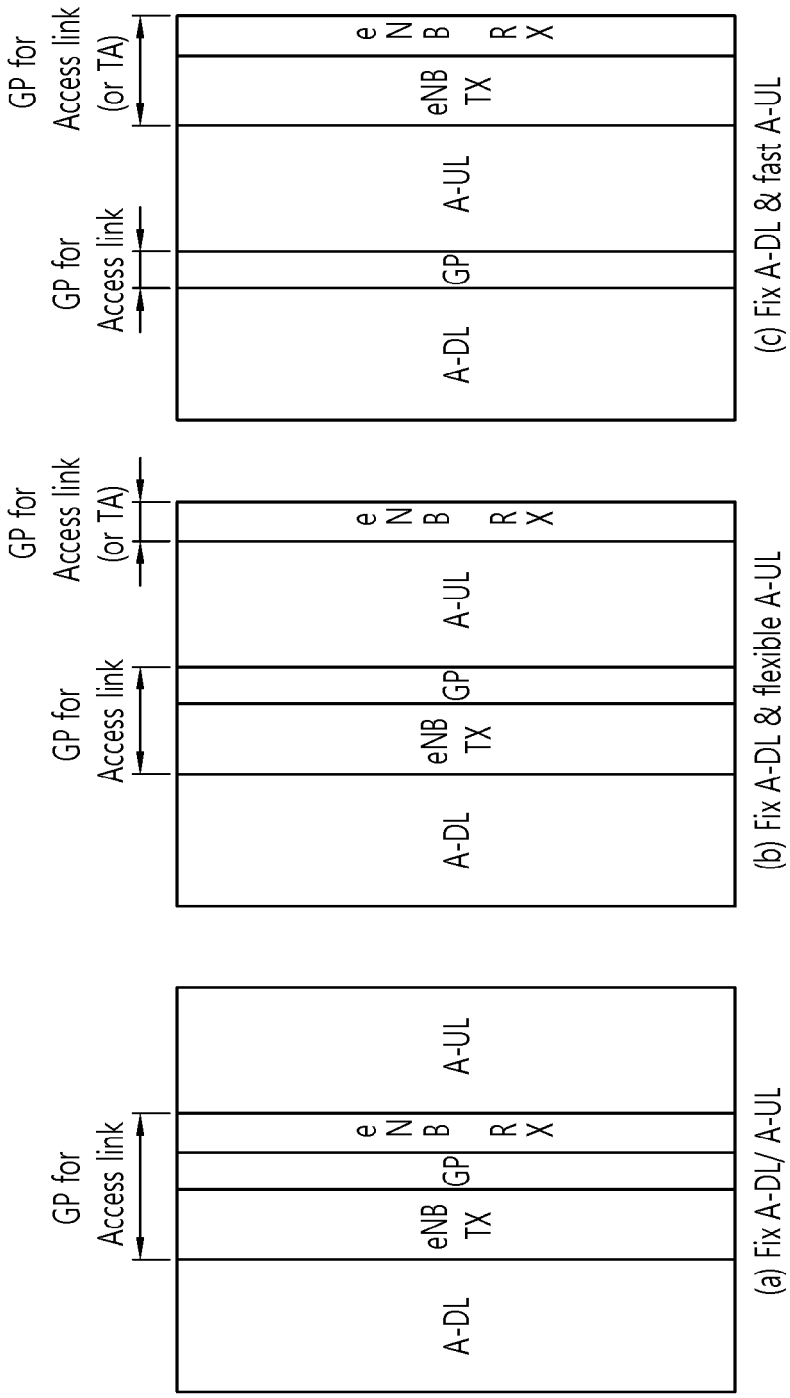

[Fig. 17]
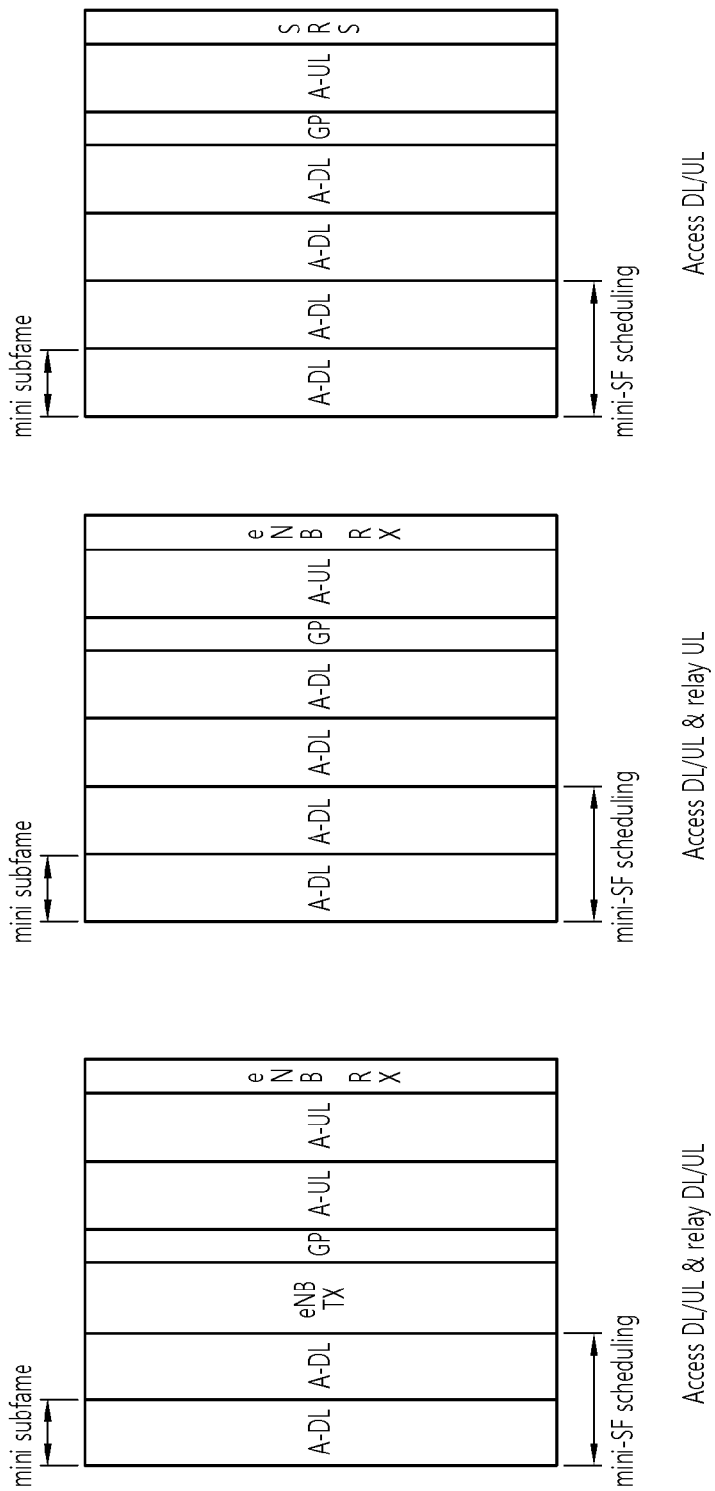

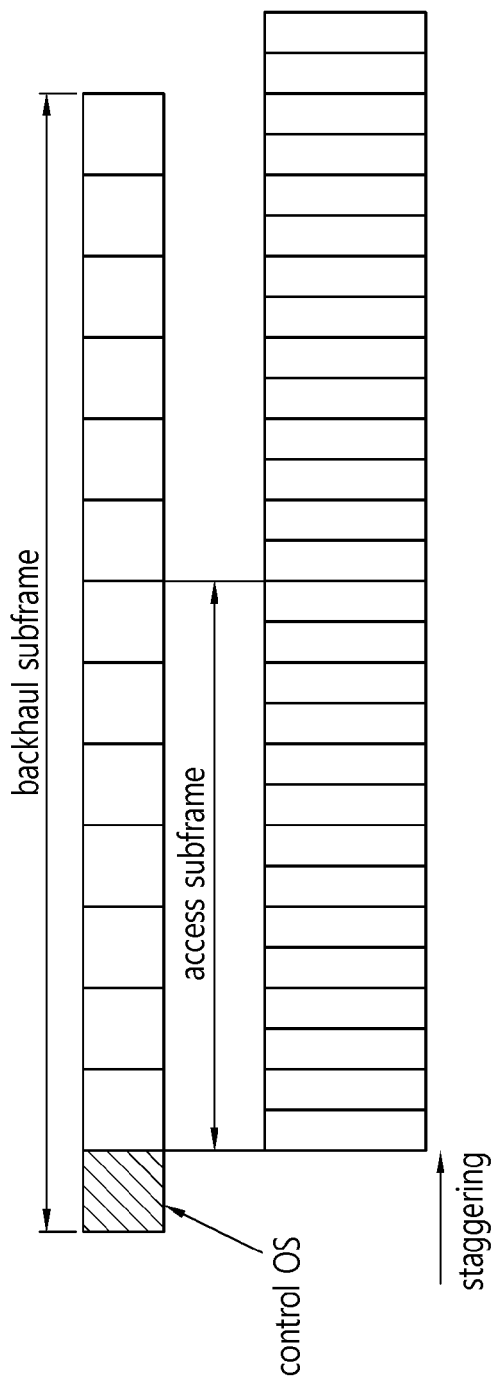
[Fig. 18]

[Fig. 19]
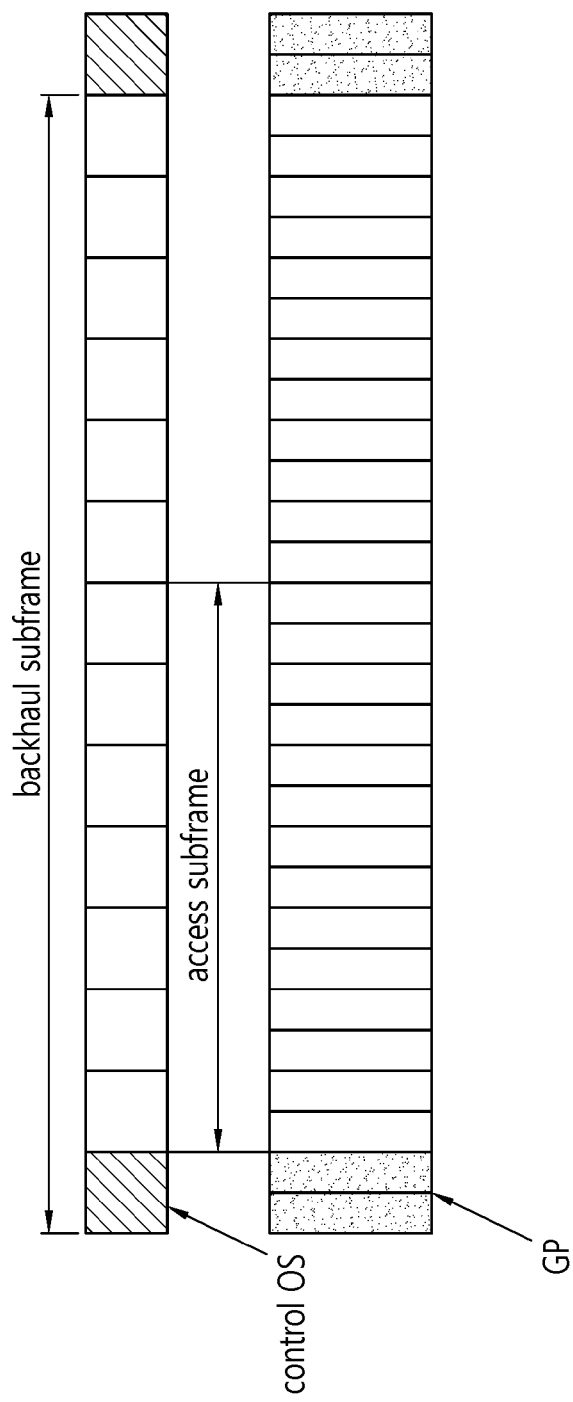

[Fig. 20]
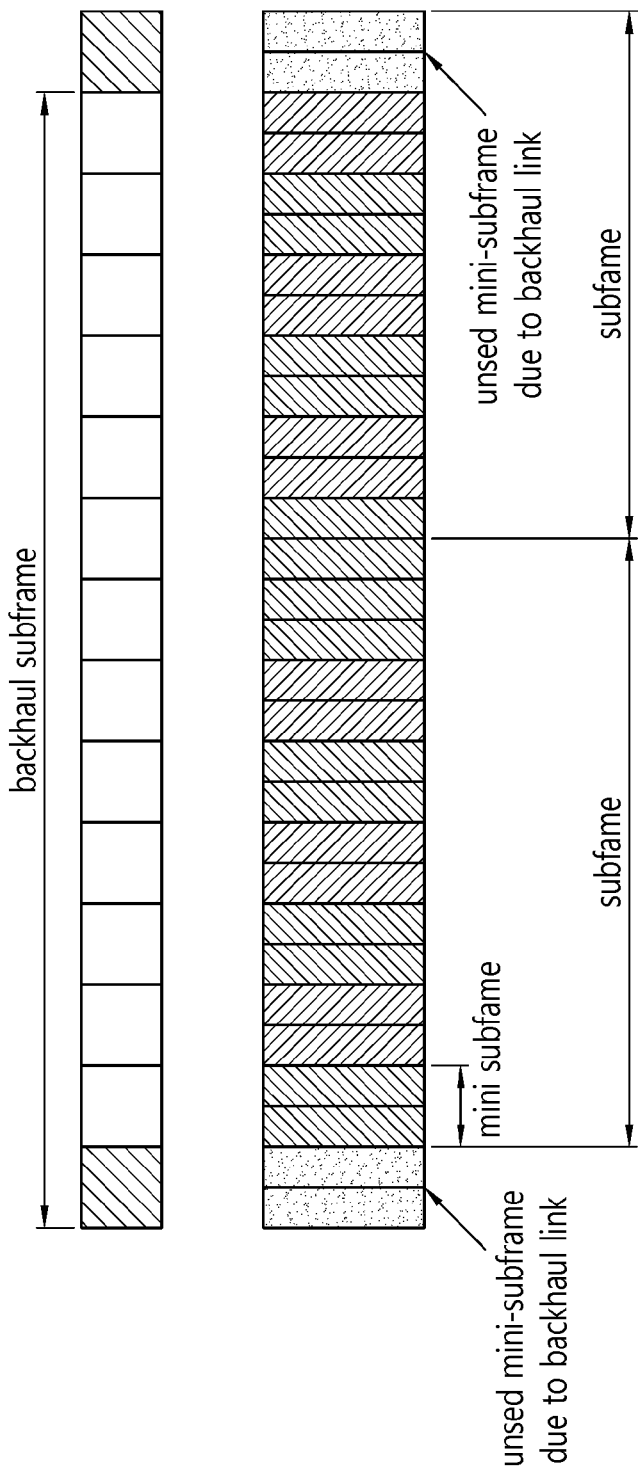

[Fig. 21]
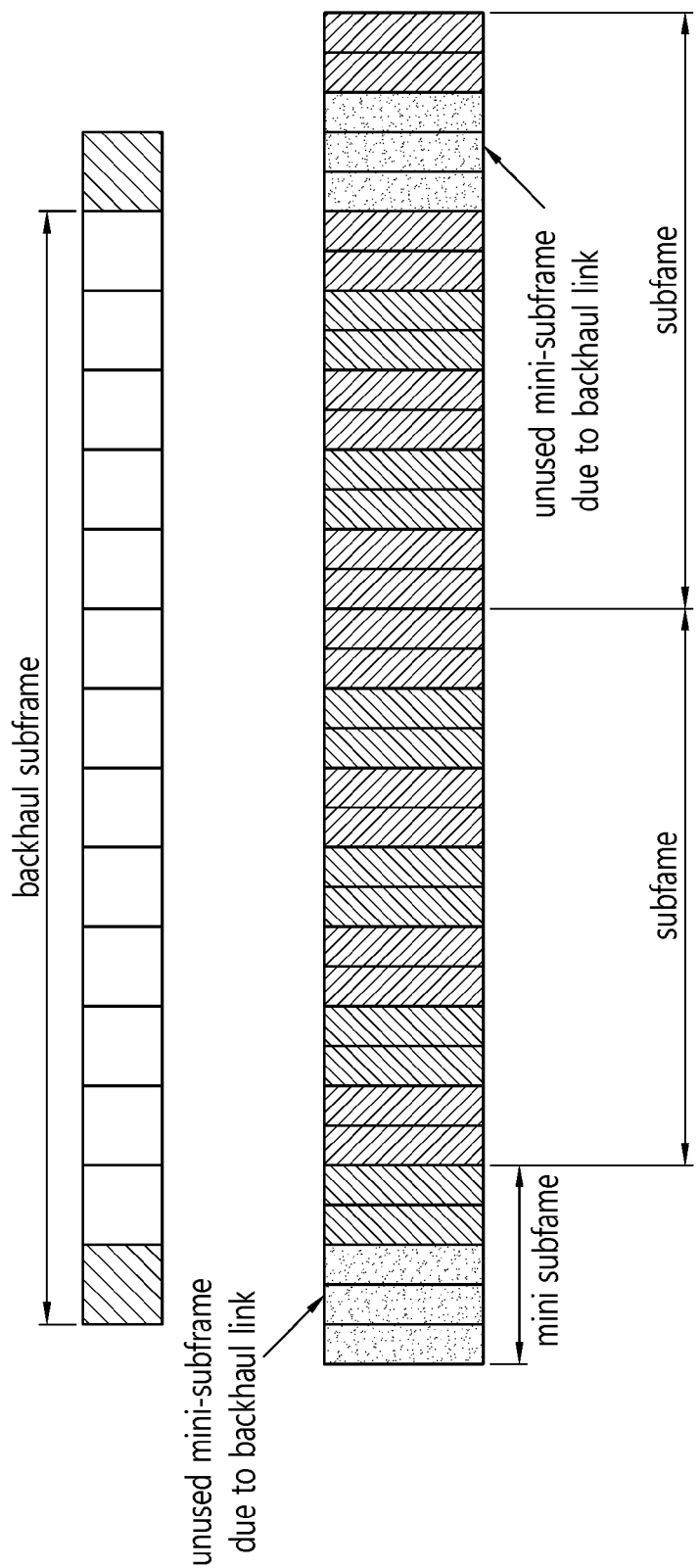

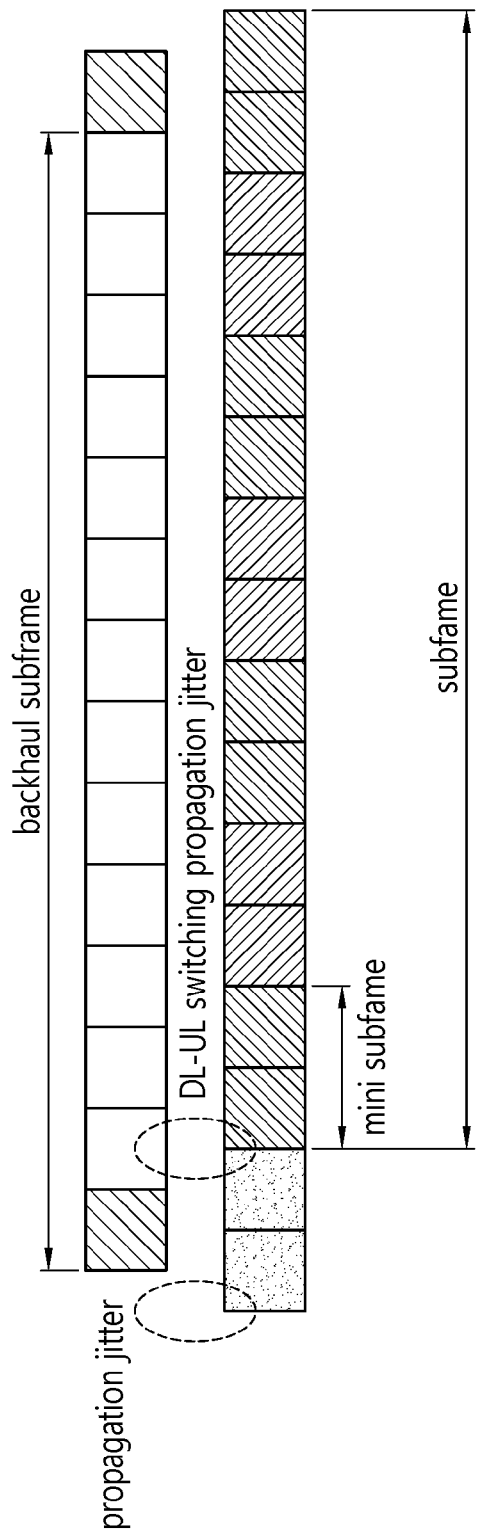
[Fig. 22]

[Fig. 23]
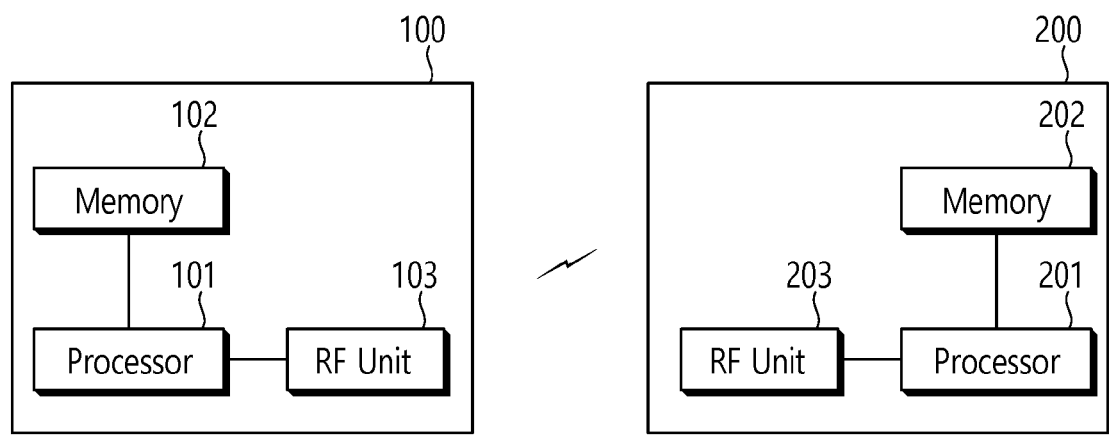

COMMUNICATION METHOD OF USING FULL DUPLEX IN NR

CROSS-REFERENCE TO RELATED APPLICATIONS

This application is a National Stage application under 35 U.S.C. § 371 of International Application No. PCT/KR2017/005811, filed on Jun. 2, 2017, which claims the benefit of U.S. Provisional Application No. 62/347,599, filed on Jun. 8, 2016, U.S. Provisional Application No. 62/362,603, filed on Jul. 15, 2016, and U.S. Provisional Application No. 62/373,961, filed on Aug. 11, 2016. The disclosures of the prior applications are incorporated by reference in their entirety.

TECHNICAL FIELD

The present invention relates to mobile communication.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience. The new RAT may be also abbreviated to a NR.

For operating NR efficiently, various schemes have to be adopted. However, until now, efficient scheme has not been introduced.

DISCLOSURE OF INVENTION

Technical Problem

Accordingly, the disclosure of the specification has been made in an effort to solve the problem. Particularly, the invention proposes multiplexing mechanisms between in-band full duplex capable and non-capable devices and efficient coexistence mechanism between LTE and NR carriers when they are adjacent.

Solution to Problem

To achieve the foregoing purposes, the disclosure of the present invention proposes a communication method. The method may be performed by a wireless device and comprise: if a full duplex of a downlink (DL) reception and an uplink (UL) transmission is configured in a carrier spectrum including a DL portion and a UL portion, considering that a subset of the DL portion in the carrier spectrum is configured as a protected DL portion for another device configured with non full-duplex. Here, the protected DL portion may allow low interference level for the another device configured with the non full-duplex by enabling the wireless device configured with the full duplex to perform only DL transmission or DL/UL with very low power for UL in the protected DL portion The DL portion and the UL portion may be flexibly configured in the carrier spectrum.

The method may further comprise: considering that the UL portion in the carrier spectrum is configured as a protected UL portion for the device configured with non full-duplex. Here, the protected UL portion may allow low interference level for the another device configured with the non full-duplex by enabling the wireless device configured with the full duplex to perform only UL transmission or DL with very low power for DL in the protected DL portion devices.

If the wireless device coexists with a long term evolution (LTE)/LTE-advanced technology based user equipment (UE) and base station, the wireless device may use semi-static DL/UL configuration where at least some subset of DL and UL of a LTE TDD DL/UL configuration are configured in an adjacent frequency band to the LTE/LTE-advanced technology based UE. In other words, DL/UL resource of a wireless device can be aligned with adjacent LTE/LTE-A carrier.

The DL portion and the UL portion in the carrier spectrum may be flexibly configured per a subframe.

To achieve the foregoing purposes, the disclosure of the present invention proposes a method for receiving a backhaul control signal. The method may be performed by a relay and comprise: receiving the backhaul control signal on at least one or more orthogonal symbols in a backhaul subframe; and performing a communication with a wireless device in an access subframe. Here, the at least one or more orthogonal symbols may be located in a front portion of the backhaul subframe. Also, a starting point of the access subframe may be staggered compared to the backhaul subframe.

The access subframe may be started after the at least one or more orthogonal symbols in the front portion of the backhaul subframe.

An overlapped portion of the access subframe with the front portion may be configured as a guard period (GP).

The access subframe may be divided into mini-subframes.

To achieve the foregoing purposes, the disclosure of the present invention proposes a wireless device comprising: a transceiver; and a processor configured to control the transceiver. If a full duplex of a downlink (DL) reception and an uplink (UL) transmission is configured in a carrier spectrum including a DL portion and a UL portion, the processor may be configured to consider that a subset of the DL portion in the carrier spectrum is configured as a protected DL portion for another device configured with the non full-duplex. Here, the protected DL portion may allow low interference level for the another device configured with the non full-duplex by enabling the wireless device configured with the full duplex to perform only DL transmission or DL/UL with very low power for UL in the protected DL portion. The DL portion and the UL portion are flexibly configured in the uplink carrier spectrum.

Advantageous Effects of Invention

According to the disclosure of the present specification, the problems of the above-described prior art are solved.

BRIEF DESCRIPTION OF DRAWINGS

FIG. 1 illustrates a wireless communication system.

FIG. 2 shows a downlink radio frame structure according to FDD of 3rd generation partnership project (3GPP) long term evolution (LTE).

FIG. 3 shows an example of subframe type for new RAT.

FIG. 4 shows an example of a paired spectrum.

FIG. 5 shows an example of multiple carriers operated in a frequency band.

FIG. 6 shows an example of flexible duplex operation in UL spectrum.

FIG. 7 shows an example between carrier block's subband and carrier's subband.

FIG. 8 shows an example of a spanning of the UCI.

FIG. 9 shows an example of a un-paired spectrum

FIG. 10 shows an example that FDD-type operation and TDD-type operation can be changed over time.

FIG. 11 shows various DL/UL flexible portions.

FIG. 12 shows an example that a sidelink resource is configured in downlink or uplink portion.

FIG. 13 shows an example of relay operation.

FIG. 14 shows an example of FDM between BH/Relay/FH and access link.

FIG. 15 shows an example of TDM between BH/relay/FH and access link.

FIG. 16 shows examples of TDM approach.

FIG. 17 shows an example of mini-subframe based sharing between backhaul and access.

FIG. 18 shows an example to use different numerology between backhaul and access link.

FIG. 19 shows an example that an overlapped portion is configured as a gap.

FIG. 20 shows one example of unused mini-subframes due to a backhaul link.

FIG. 21 shows another example of unused mini-subframes due to a backhaul link.

FIG. 22 shows GP symbols due to DL-UL switching.

FIG. 23 is a block diagram illustrating a wireless communication system according to an embodiment of the present invention.

MODE FOR THE INVENTION

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 illustrates a Wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

As such, one subframe is called as a transmission-time-interval (TTI). TTI refers to the duration of a transmission. So, the base station schedule the radio resource in unit of the TTI, e.g., subframe.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a physical uplink shared channel (PUSCH) transmitted through other component carriers than the component carrier basically linked to a specific component carrier and/or resource allocation of a physical downlink shared channel (PDCCH) transmitted through other component carriers through a physical downlink control channel (PDCCH) transmitted through the specific component carrier.

<Next Generation Mobile Network>

5th generation mobile networks or 5th generation wireless systems, abbreviated 5G, are the proposed next telecommunications standards beyond the current 4G LTE/international mobile telecommunications (IMT)-dvanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (NR).

In NR, utilizing a subframe in which downlink and uplink are contained may be considered. This scheme may be applied for paired spectrum and unpaired spectrum. The paired spectrum means that one carrier consists of two parts of spectrum for downlink and uplink operation. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further in new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 3 shows an example of subframe type for new RAT. The subframe shown in FIG. 3 may be used in TDD system of new RAT, in order to minimize latency of data transmission. Referring to FIG. 3, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

<Disclosure of the Invention>

I. First Disclosure

In new RAT, both paired and unpaired spectrum are considered to be supported. In the paired spectrum, it is generally considered that downlink and uplink spectrum are apart each other with duplex gap in between. Generally, for paired spectrum, multiple operators share downlink or uplink portions in adjacent carrier. Thus, when one operator or one eNB performs flexible duplex or full duplex operation, there could be potential interference to neighbouring eNBs or adjacent carriers.

I-1. Paired Spectrum & Flexible/Full Duplex

In case, paired spectrum is used, and eNB may change its uplink or downlink direction in either UL or DL carrier, the following options of spectrum partitioning/usage could be considered.

(a) Assume all operators are aligned in terms of flexible duplex operation, including downlink/uplink configurations. Some uplink and/or downlink carrier/spectrum may be defined as "flexible spectrum" which can be used either for downlink or uplink or downlink/uplink at a given time. In this case, the entire uplink or downlink spectrum can be changed to downlink or uplink (or full duplex downlink/uplink) To align the configuration among neighbour cells, it may be assumed that each eNB may exchange intended configuration via backhaul signalling among different operators or assigned in prior or may follow "detected" configuration based on "sensing" of neighbour cells.

(b) In case different configurations among neighbour cells in adjacent carrier(s) can be used, some consideration of guard band seems necessary. Or, necessary cross-link interference mitigation techniques are considered. Furthermore, if downlink operation is performed in uplink spectrum, the spectrum mask may be defined which should be satisfied by the transmitter (similar for uplink operation in downlink spectrum) which can be tighter compared to downlink operation in downlink spectrum (and uplink operation in uplink spectrum). To meet such requirement and/or minimize the interference, some dynamic adaptation of "guard band" can be considered as follows. For example, depending on the usage of spectrum, the presence of guard band and the size of guard band can be dynamically adapted which is adjusted according to its requirements on outband emission, interference level to neighbour cells in the same frequency and neighboring cells in the adjacent frequencies/carriers.

FIG. 4 shows an example of a paired spectrum

Referring to FIG. 4, it is assumed that a carrier can be defined as a contiguous set of subbands (e.g., the subband size may be fixed such as 5 Mhz) which can change its center frequency or start/end frequency dynamically or semi-statically in different subframe(s) (i.e., frequency location may change per time), and one carrier may contain one synchronization signals (i.e., independent carrier may contain synchronization and/or BCH channel). As shown in FIG. 5, each operator may own multiple carriers in one spectrum chunk (called as carrier block for the convenient in this invention) as the follows.

It is noted that entire spectrum allocated to one operator may be used with one numerology in which case guardband between different carrier at least for one operator may not be necessary. It is also noted that guard band may be created via scheduling where it may be assumed that only data is not transmitted over guard band or any signal is not transmitted over guard band. Depending on the interference level, dynamic guard band size can be determined and scheduled by the network. Within a carrier, to operate flexible duplex and/or full duplex operation, considering adjacent carrier's direction, guard band or gap can be considered as the follows.

FIG. 6 shows an example of flexible duplex operation in UL spectrum.

As shown in FIG. 6, if the network supports full duplex capability, uplink spectrum can be divided into downlink and uplink subbands within a carrier block (Operator A). If the network does not support full duplex capability, it may allocate downlink subband and guardband to minimize interference to uplink transmission on adjacent carrier block. It's noted that downlink subband in terms of subband bandwidth and/or location may change per subframe. For example, if TDD type of operation is used in uplink spectrum, TDD configuration may be different per subband. One example is that for Operator A, to allow guard band between Operator A and B's carrier, at least 5 MHz uplink subband may be assumed, and the remaining subbands can be used for downlink transmission. However, depending on the required uplink spectrum usage, downlink and uplink configuration can be dynamically/semi-statically configured. One example is to configure TDD configuration such as D:U=3:1 over 4 subframes may be configured for the remaining subbands which can be flexibly changed between downlink and uplink. This implies that downlink and uplink configuration can be configured per subband based rather than a carrier based. Also note that for this subband for ICIC purpose negotiation can span more than one carrier which may be separated by different numerology and/or usage. In other words, this subband can be constructed over the entire carrier block or spectrum chunk of frequency band. The subband within a carrier can be different from the subband in a carrier block. For example, as shown in FIG. 7, the carrier block's subband may be different from carrier's subband.

Thus, within a carrier, different DL/UL configuration can be considered frequency region overlapped with each subband. In terms of different subband, it may be configured the set of subband configurations, and each configured subband can be configured with different DL/UL configuration where uplink usage portion fixed for adjacent carrier protection may consist of "fixed" UL subframes which may not be changed. This would also impact on scheduling resource assignment where resource assignment may be performed per subband basis where resource allocation may be performed over multiple subbands which can be dynamically or semi-statically configured (i.e., the resource allocation bandwidth can be higher layer configurable). The configuration can be further different per UE-based. For example, there could be different UE capability in terms of supporting full duplex or not (assuming the network supports full duplex capability). If a UE supports full duplex, instead of DL/UL configuration, only subband may be configured or high power and low power subframe configuration may be given where the subframes configured with high power can use high power. It may be assumed that different power can be configured and used in a different set of subframes. Alternatively, full duplex UE may interpret "DL" portion as "protected DL" portion to non full-duplex UEs (i.e., UEs without self-interference cancellation capability) where for non-full duplex UEs, the resource are assumed as DL and for full-duplex UEs may may be performed with either low power or other means to minimize the interference. On the other hand, it may interpret "UL" portion as "protected UL"

for possibly non full-duplex eNBs (i.e., eNBs without self-interference cancellation), thus, it may assumed that different power (e.g., lower power) or different waveform (such as waveform used in uplink) may be used by full-duplex UEs if it receives (i.e., used as DL resource) in such resources. Furthermore, it is still possible that fixed DL and/or UL subframe or portion may be still considered with full duplex capability to allow "inter-cell interference protection" among neighbor cells in the same or adjacent carriers.

In terms of utilizing resources for self-interference cancellation UEs, the followings can be considered.

As RS transmission is important for channel estimation, some downlink "only" resources or fixed downlink resources are assumed. One example is to assume the first OFDM symbol in every subframe or mini-subframe or the first OFDM symbol where data can be mapped (e.g., $3^{rd}$ OFDM symbol or 4th OFDM symbol) for this purpose. Additional RS may be transmitted for any enhanced transmission such as MIMO in other region. In other words, resource used for DM-RS transmission may be configured as "protected" DL. Similarly for UE uplink transmission, DM-RS may be transmitted in the first OFDM symbol for channel estimation for self-interference cancellation. Instead of fixing the entire symbol, subset of frequency band can be reserved. This can be also expanded for control information such as downlink control and uplink control.

For efficiency of self-interference cancellation, if a UE is configured with full duplex operation, it may use the same waveform used in downlink transmission at least in resources which can be performed with both downlink and uplink transmission. In the fixed uplink portion which are fixed as uplink transmission such as for UCI transmission, a UE may use different waveform to reduce PAPR. For example, a UE may use SC-FDM for UCI transmission in the fixed uplink portion and OFDM for other transmission in the resources which can be used for both downlink and uplink transmission (or sidelink and downlink).

Thus, if a UE support sidelink operation which is compatible to LTE or UE supports uplink transmission which is compatible to LTE, it would use SC-FDM in those resources.

In other resources, it can use OFDM.

More generally, uplink resource can be configured with SC-FDM and OFDM resources (i.e., with different waveform) (in addition to numerology).

More generally, SC-FDM may be replaced with OFDM with DFT spreading.

Also for self-interference cancellation or supporting downink/uplink transmission simultaneously, it can be generalized that only downink operation is performed in fixed DL portion, only uplink operation is performed in fixed UL portion, and either or both DL/UL can be performed in flexible portion. For sidelink operation, it may be done only in flexible DL/UL portion. In fixed UL portion, to enhance PAPR, SC-FDM or OFDM with DFT spreading may be used, and in flexible resource, OFDM may be used. For SL with SC-FDM may be performed either resources dedicated to SC-FDM or sidelink resources among the fixed UL resources.

Alternatively, resources may be partitioned based on waveform mechanism.

If FDM between downlink and uplink in uplink spectrum is considered (where downlink and uplink can be partially or fully overlapped depending on self-interference cancellation property), semi-static configuration of "uplink bandwidth" may not properly working as the uplink bandwidth may change depending on whether downlink operation is performed or not. For example, as shown in below, if downlink portion is present or not changes dynamically, uplink bandwidth can change dynamically as well. Thus, either dynamic bandwidth (start-end frequency location) is supported or configuration may not be dependent on actual uplink resource or any semi-static uplink resource configuration in frequency domain may not be assumed. A simple approach is to fix "downlink portion" and "uplink portion" in case downlink is used by semi-static configuration (e.g., via SIB), and then dynamically indicate whether downlink is present or not. If dynamic signaling supports, explicit dynamic indication of "start" and "end" frequency location of uplink portion can be considered. This may be represented as dynamic change of uplink RB size or resource size and starting frequency location. When uplink resource becomes smaller, if reliable signaling can be considered, resource allocation size can be also reduced. Furthermore, in terms of RB index, it may also change. If the signaling is not consider as reliable (due to dynamic change, etc), fixed uplink RB index and location may be assumed for scheduling/configuration.

FIG. 8 shows an example of a spanning of the UCI.

As shown in FIG. 8, if UCI is spanned over time on near edge resource, UCI resource may change depending on uplink bandwidth, and if UCI spans over the entire bandwidth, the spanning bandwidth can be changed. In other words, depending on the configured bandwidth, the location where UCI can be transmitted can be dynamically adapted.

I-2. Un-Paired Spectrum & Flexible/Full Duplex

FIG. 9 shows an example of a un-paired spectrum

When unpaired spectrum is allocated, flexible duplex operation can be achieved by the following approaches.

Partition unpaired spectrum to paired spectrum of downlink and uplink subbands if the network can support downlink and uplink simultaneously assuming downlink/uplink duplex gap (Operator A).

If the network supports full duplex capability, the spectrum can be partitioned to uplink subband and flexible DL/UL subband (Operator B).

If the first approach is used, FDD-type operation and TDD-type operation can be changed over time as illustrated in below.

For example, as shown in FIG. 10, there could be negotiated "DL/UL" configuration per subframe or per subframe group which can be used as a reference that each cell is supposed to use without full or flexible duplex operation. Each cell may change its DL/UL configuration based on flexible or full duplex operation. For example, in subframe 1, the subframe type (negotiated subframe type) is configured as DGU (DL subframe with UCI transmission portion) for Operation A/B. If Operator B does not apply full/flexible operation, the subframe type can be used with DGU. If Operator A wants to use flexible duplex operation (to minimize the latency), in downlink portion, DL and UL can be operated with sufficient duplex gap, and then in uplink portion, the frequency of DL and UL can be switched to minimize the interference on adjacent carrier. Alternatively, for ICIC in the same frequency, uplink spectrum or uplink portions configured as uplink portions with inter-cell coordination, may be used with uplink only. As generally cells in the same frequency may be operated by the same operator, inter-cell coordination may be assumed by tight coordination which can also include "alignment" of DL/UL portions in time/frequency. In case, the network supports full duplex capability configured as UL subframe with downlink control portion can utilize some subbands for DL/UL flexible usage with necessary gap or uplink portion to adjacent uplink spectrum.

In summary, the following is proposed in unpaired spectrum.

For ICIC in adjacent and co-channel, consider "reference" DL/UL configuration agreed to be used without dynamic DL/UL switching.

This reference DL/UL configuration may include subframe type or DL/UL portion in each subframe or may include at least subset of DL portions and subframe of UL portions over a set of subframes. For example, DL subframe may be assumed in subframe #0/#5 (DL subframe refers DL with a guard period (GP), and one or two UL OFDM symbols), and UL subframe may be assumed in subframe #2 (UL subframe refers one or two DL OFDM symbols with GP and the rest OFDM symbols with DL). Other subframes may be assumed as "flexible subframe" which can be used flexibly by each cell or all subframe may have reference DL/UL portion. Another example is to assume one or two first OFDM symbols as downlink (for control) and one or two last OFDM symbols as uplink (for UCI) per subframe. In other regions, flexible usage of spectrum may be considered.

Note that 'reference DL/UL configuration' can be also configured per subband or per subband group. For example, if one carrier block is divided into multiple subbands, one or multiple reference DL/UL configurations can be given per subband or per subband group. For adjacent carrier case, reference DL/UL configuration can be different between carrier block 1 and carrier block 2, and carrier block 2 and carrier block 3 (assuming carrier 1, 2, 3 are consecutively allocated in a frequency domain in sequence). In terms of "aligning" DL/UL configuration, the reference DL/UL configuration to those subbands may be used. In other words, the following approach can be supported.

For a carrier block C1, C2, and C3 which are sequentially allocated unpaired frequency, each carrier is divided into M1, M2, and M3 subbands. Assuming one subband from each carrier is assumed as "adjacent" to the next carrier, it is necessary to align DL/UL configuration of subband M1 of C1 and subband 1 of C2, and subband M2 of C2 and subband 1 of C3. Other subbands of each carrier can have flexible configuration. The following shows an example of this case. To easy the coordination, one typical type may be considered for adjacent subband configuration. In case, the cell support full duplex capability, downlink portions may be used in downlink and uplink simultaneously assuming interference on uplink from adjacent carrier's downlink can be mitigated by some means (such as interference cancellation). However, uplink portions may be used for uplink only to minimize interference. In other words, fixed uplink may be assumed as "fixed" for full duplex supporting eNBs, and both downlink and uplink portions are assumed as "fixed" for non full duplex supporting eNBs on the same time/frequency resource.

For ICIC in co-channel, as shown in FIG. 11, DL/UL flexible portions may be negotiated or at least subset of subframes or fixed DL and/or UL portions may be negotiated among cells or aligned among cells in co-channel via backhaul signaling. For this, intended configuration can be exchanged and aligned. To support this, rather that aligning at each subframe level, DL/UL or fixed DL portion and/or UL portion may be fixed over multiple subframes (e.g., one DL portion in every 'm' subframes). Furthermore, the reference subband configuration may be determined based on the assumption that each cell uses the same numerology and/or same CP length. If different numerology or different CP is used, proer consideration in guard band should be further considered. In other words, for adjacent carrier, subband DL/UL configuration alignment can be considered, and for co-channel carriers, typical ICIC techniques to align DL/UL configuration and/or power control can be used. As different numerology may have different subframe length, this reference configuration should be defined based on "reference" numerology with subcarrier spacing/CP length. One reference can be with 15 kHz and normal CP as in LTE. In this case, if numerology is with 30 kHz, one subframe of reference DL/UL can correspond to 2 subframes of 30 kHz case. This is typically true in case LTE and new RAT can coexist. When LTE and new RAT coexist, as LTE may not define subband, in new RAT subband may follow legacy LTE TDD DL/UL configuration in the adjacent subband to legacy LTE. Or, NR may follow at least have semi-statically configured DL/UL configuration which can protect important DL and UL subframes of LTE or intended DL/UL resources of LTE carrier. This can be also done in case one operator has wide spectrum which will be shared between LTE and new RAT TDD. In that case, LTE can utilize legacy TDD DL/UL configuration, and the adjacent subband of new RAT may utilize the same legacy TDD DL/UL configuration whereas other spectrum/frequency/subbands can be deployed with different DL/UL configurations. In case, full duplex capabilities are assumed among neighbor cells in adjacent carriers as well, only subset of fixed DL and/or UL portions may be fixed to allow reliable downlink (such as sync transmission) and uplink transmission (such as PRACH transmission).

Based on reference DL/UL configuration, in fixed DL portion by the reference configuration, to minimize UE-to-UE interference, fixed DL portion is assumed as "downlink" portion among the cells in co-channel or "downlink" if a carrier has adjacent carrier. Uplink subband may be used with flexible or full duplex operation with or without necessary gap.

Based on reference DL/UL configuration, in fixed UL portion by the reference configuration, to minimize eNB-to-eNB interference, fixed UL portion is assumed as "uplink" portion among the cells in co-channel or "uplink" if a carrier has adjacent carrier. Downlink subband may be used with flexible or full duplex operation with or without necessary gap.

To support this, DL/UL configuration per subband is necessary, and flexible frequency change of DL/UL subband depending on the situation is necessary.

I-3. Sidelink Operation

So far, the frequency usage between the network and UE has been discussed. When sidelink operation is considered, the direction between the network and UE may not be relevant. In other words, either uplink portion or downlink portion can be used for sidelink operation from "intra-cell perspective". However, from ICIC perspective, sidelink resources may be considered as "uplink portions" as UEs can utilize the resources for transmissions. From a cell perspective, in the configured sidelink resources, it can transmit downlink to UEs who are not participating sidelink operation. Thus, to obtain the information, a UE may indicate whether it participates in sidelink operation or not such that resources may not collide at the UE side unless UE supports "full duplex capability". Even if UE supports full duplex capability, downlink transmission from the eNB and from another UE may collide. Thus, either orthogonal resource/transmission is used or sidelink resources may not be used for sidelink participating UEs. Note that receiving may occur in the resources configured by neighbour cells. Thus, resource exchange among neighbour cells would be necessary if downlink transmission is supported in the configured sidelink resources.

If a sidelink UE supports simultaneous transmission and reception on sidelink bandwidth/carrier (e.g., it supports DL/UL operation with sufficient duplex gap or supports full duplex), to support such UEs, more than one frequency resources in a subframe can be configured for sidelink resources.

FIG. 12 shows an example that a sidelink resource is configured in downlink or uplink portion.

As shown in FIG. 12, sidelink resource may be configured in two frequency subband (in subframe 1) which can be used for downlink and uplink simultaneously if a UE supports simultaneous TX/RX. Sidelink resource may be configured in downlink or uplink portion where sidelink UEs may not perform downlink or uplink to eNB. In terms of UE capability, if a UE supports FDD carrier, it can be used for supporting sidelink and communication with eNB in a TDM manner and/or FDM manner. For example, in subframe 1, uplink logic can be used in upper frequency between eNB communication and sidelink communication while downlink log can be used in lower frequency part between eNB communication and sidelink communication. If a UE cannot operate eNB downlink and sidelink reception simultaneously, it may need to be informed to the network such that scheduling may not occur in such resources. The UE may also indicate a set of intended sidelink resources for sidelink reception.

Sidelink resource may not configured (regardless of eNB support on full duplex capability) in the fixed downlink portion which is assumed to be downlink portion due to ICIC on adjacent carrier or co-channel case to minimize interference on downlink reception of neighboring cells. Otherwise, it can be configured either in uplink portion and/or flexible DL/UL portions. Depending on cases, there could be the case, no portion is fixed as fixed downlink.

I-4. Relay Operation (Inband Relay or Self-Backhauling)

In terms of relay operation for self backhauling, three types of resource sharing can be considered.

TDM: eNB downlink and relay reception (or eNB uplink and relay transmission) may be shared in TDM manner. This could be similar to sidelink operation where eNB may share the resources in TDM manner.

FDM: if eNB supports simultaneous TX/RX with duplex gap, it can perform downlink and relay reception simultaneously in different frequency subband (or uplink and relay downlink) The mentioned subband partitioning between downlink and uplink can be assumed for this purpose as well where uplink usage or uplink portions may be used for relay reception and downlink usage or downlink portion may be used for relay transmission. Alternatively, uplink usage or uplink portion may be used for relay transmission in which case, proper ICIC or impact handling on adjacent carrier block should be addressed. For relay reception, uplink portion may be also used in this case similar to half-duplex sidelink operation.

Full duplex between eNB uplink and relay downlink (or eNB downlink and relay uplink): if eNB supports full duplex, one resource may be used for downlink and relay reception (or uplink and relay transmission).

For example, if the following scenario is supported in one frequency band, one example of spectrum partitioning or frame structure assumed by each cell can be as in below.

FIG. 13 shows an example of relay operation.

Below table relates to a paired spectrum & no full/flexible duplex operation

TABLE 1

| | SF1 | SF2 | SF3 | SF4 | SF5 | SF6 | SF7 | SF8 |
|---|---|---|---|---|---|---|---|---|
| DL band (eNB1) | DL | DL | Relay TX | DL | DL | DL | DL | DL |
| UL band (eNB1) | UL | UL | Relay RX | UL | UL | UL | SL | SL |
| DL band (RRH1) | DL | DL | Relay RX | DL | DL | DL | DL | DL |
| UL band (RRH1) | UL | UL | Relay RX/TX | UL | UL | UL | SL | |
| DL band (RRH2) | | | | | | | | |
| UL band (RRH2) | | | Relay TX/RX | | | | | |
| DL band (UE1) | DL | DL | DL | DL | DL | DL | DL | DL |
| UL band (UE1) | UL | UL | UL | UL | UL | UL | SL TX/RX | SL TX/RX |
| DL band (UE2) | DL | DL | DL | DL | DL | DL | DL | DL |
| UL band (UE2) | UL | UL | UL | UL | UL | UL | SL TX/RX | SL TX/RX |

Below table relates to a paired spectrum & full/flexible duplex operation at eNB1

TABLE 2

| | SF1 | SF2 | SF3 | SF4 | SF5 | SF6 | SF7 | SF8 |
|---|---|---|---|---|---|---|---|---|
| DL band (eNB1) | DL | DL | DL | Reserved | Reserved | DL | DL | DL |
| UL band (eNB1) | Relay TX/UL | Relay TX/UL | Relay TX/RX | UL | UL | UL | SL | SL |
| DL band (RRH1) | | | | DL | DL | | | |
| UL band (RRH1) | Relay RX | Relay RX | Relay RX/TX | UL | UL | | | |
| DL band (RRH2) | | | | | | | | |
| UL band (RRH2) | | | | Relay TX/RX | | | | |
| DL band (UE1) | DL | DL | DL | | | DL | DL | DL |

TABLE 2-continued

|  | SF1 | SF2 | SF3 | SF4 | SF5 | SF6 | SF7 | SF8 |
|---|---|---|---|---|---|---|---|---|
| UL band (UE1) | UL | UL |  |  |  | UL | SL TX/RX | SL TX/RX |
| DL band (UE2) |  |  |  | DL | DL |  |  |  |
| UL band (UE2) |  |  |  | UL | UL |  | SL TX/RX | SL TX/RX |

Below table relates to a paired spectrum & full/flexible duplex operation at eNB1/RRH1

TABLE 3

|  | SF1 | SF2 | SF3 | SF4 | SF5 | SF6 | SF7 | SF8 |
|---|---|---|---|---|---|---|---|---|
| DL band (eNB1) | DL/Relay RX | DL/Relay RX | DL/Relay RX | DL/Relay RX | DL/Relay RX | DL/Relay RX | DL/Relay RX | DL/Relay RX |
| UL band (eNB1) | Relay TX/UL | Relay TX/UL | Relay TX/UL | Relay TX/UL | Relay TX/UL | Relay TX/UL | Relay TX/SL | Relay TX/SL |
| DL band (RRH1) | DL/Relay RX | DL/Relay RX | DL/Relay RX | DL/Relay RX | DL/Relay RX | DL/Relay RX | DL/Relay RX | DL/Relay RX |
| UL band (RRH1) | Relay TX/UL | Relay TX/UL | Relay TX/UL | Relay TX/UL | Relay TX/UL | Relay TX/UL | Relay TX/SL | Relay TX/SL |
| DL band (RRH2) | Relay TX | Relay TX | Relay TX | Relay TX | Relay TX | Relay TX | Relay TX | Relay TX |
| UL band (RRH2) | Relay RX | Relay RX | Relay RX | Relay RX | Relay RX | Relay RX | Relay RX | Relay RX |
| DL band (UE1) | DL | DL | DL | DL | DL | DL | DL | DL |
| UL band (UE1) | UL | UL | UL | UL | UL | UL | SL TX/RX | SL TX/RX |
| DL band (UE2) | DL | DL | DL | DL | DL | DL | DL | DL |
| UL band (UE2) | UL | UL | UL | UL | UL | UL | SL TX/RX | SL TX/RX |

Below table relates to an un-paired spectrum & no full/flexible duplex operation at eNB1/RRH1.

TABLE 4

|  | SF1 | SF2 | SF3 | SF4 | SF5 | SF6 | SF7 | SF8 |
|---|---|---|---|---|---|---|---|---|
| (eNB1) | DL | UL | Relay TX/RX | UL | DL | SL | DL | UL |
| (RRH1) | DL | UL | Relay TX/RX | UL | DL | SL | DL | UL |
| (RRH2) |  |  | Relay TX/RX |  |  |  |  |  |
| (UE1) | DL | UL |  | UL | DL | SL | DL | UL |
| (UE2) | DL | UL |  | UL | DL | SL | DL | UL |

Below table relates to an un-paired spectrum & full/flexible duplex operation at eNB1/RRH1.

TABLE 5

|  | SF1 | SF2 | SF3 | SF4 | SF5 | SF6 | SF7 | SF8 |
|---|---|---|---|---|---|---|---|---|
| (eNB1) | DL/relay RX | UL/relay TX | DL/relay RX | UL/relay TX | DL/relay RX | SL/relay TX | UL/relay TX | DL/relay RX |
| (RRH1) | DL/relay RX | UL/relay TX | DL/relay RX | UL/relay TX | DL/relay RX | SL/relay TX | UL/relay TX | DL/relay RX |
| (RRH2) | Relay TX | Relay RX | Relay TX | Relay RX | Relay TX | Relay RX | Relay RX | Relay TX |
| (UE1) | DL | UL | DL | UL | DL | SL | DL | UL |
| (UE2) | DL | UL | DL | UL | DL | SL | DL | UL |

Basically, relay downlink is done via downlink portion if uplink and downlink utilize different waveform and a UE may have cancellation capability. Otherwise, relay node can be treated as if "a UE" and thus it utilize uplink spectrum for relay operation (for both downlink and uplink) and it may performs "TDD-type" operation in uplink spectrum. This can be more efficiently done if full duplex is supported by eNB and/or RRH such that relay operation and communication with UE can be achieved simultaneously.

If Full/Flexible Duplex Capability is Supported by the Network
- It can support communication with UE and communication between eNBs simultaneously
- Either in the same time/frequency resource or in different frequency resources at the same time
- It can support communication to one UE and sidelink operation among different UEs
- Either in the same time/frequency resource or in different frequency resources at the same time
- It can support communication with relaying node and with UEs simultaneously
- May support downlink to relay and uplink from UE simultaneously or uplink from relay and downlink to UE simultaneously either in the same time/frequency resource or in different frequency resources at the same time II. Second Disclosure (Relay/Backhaul Operation)

When the network utilizes relay/backhaul/fronthaul with access link in each the same frequency or different frequency, various TDM/FDM mechanisms are considered. To support flexible operation, it is also necessary to allow dynamic direction switching or purpose/waveform of the resource.

Let's call different link as
(1) BH-TX: backhaul transmission from a node A
(2) BH-RX: backhaul reception at a node A
(3) Relay-TX: relay transmission from a node A (a node can be eNB or UE)
(4) Relay-RX: relay reception at a node A (a node can be eNB or UE)
(5) FH-TX: front-haul transmission from a node A
(6) FH-RX: front-haul reception at a node A (a node can be RRH or baseband unit)
(7) A-DL: access link downlink from a eNB to a UE
(8) A-UL: access link uplink from a UE to a eNB
(9) SFN-DL: access link downlink from multiple eNBs
(10) SFN-UL: access link uplink from multiple UEs
(11) SL-TX: sidelink transmission from a node A
(12) SL-RX: sidelink transmission at a node A Each link may utilize different numerology depending on the deployment scenarios and requirements. To support various link directions and different communication pairs, it can be considered to have a common waveform structure. However, from a network perspective, not to have unnecessary restriction between downlink and uplink, the following approach can be considered in co-channel case.

To support either FDM or TDM (or both) as shown in FIG. 14 or FIG. 15, frequency region and time region of access link should be flexible. This can be realized via "additional gap" before and/or after access DL or UL. For sidelink, the resource can be placed in either access DL or access UL. If different waveform is used for sidelink from access DL, it is desirable to utilize access UL resources for sidelink. For SFN-DL or SFN-UL, as it may utilize different numerology, it is desirable to consider FDM between access DL/UL and SFN DL/UL resources. However, TDM can be also considered.

In terms of TDM approach, the time for access link can reduced to accommodate BH/relay/FH link access as shown in below. Depending on whether to have one or two GP in a subframe or in a subframe group, different approach can be considered.

In other words, from a UE perspective, depending on the presence of BH/relay/FH access, access-DL and/or access-UL region can be flexibly adjusted (if TDM is used, time is adjusted, if FDM is used, frequency region is adjusted). This can be indicated via dynamic scheduling from DCI which can indicate "end of downlink portion" and "GP" length dynamically or "start of uplink portion?.

FIG. 16 shows examples of TDM approach.

For approach (a) and approach (b), the second gap after uplink may be accommodated explicitly or by TA. In case explicit indication is used, the gap size may be semi-statically configured, and the presence of the gap can be indicated dynamically. For approach (a), and (c), the similar approach may be used where the gap size is semi-statically configured, and the presence of the gap(s) can be dynamically indicated. For approach (c), it is assumed that GP is fixed from a UE perspective, and the size of DL+GP+UL can change dynamically or semi-statically depending on other link Overall, it is highly desirable to indicate the length of downlink/uplink portion and GP length(s) dynamically to accommodate dynamic BH/FH/relay link resources.

In case TDM between different links are performed in a subframe or in a time duration, it is considerable to partition one subframe or one time duration into multiple mini-subframe or multiple sub time durations. Each mini-subframe or sub time duration can be scheduled with either link or any link which can be controlled dynamically via scheduling. If the network may need "GP", in a subframe, minimum GP that the network requires can be configured which is not accounted for the mini-subframe. For example, example (c) in the above figure can be divided into two mini-subframe of downlink, GP, and four mini-subframe of uplink and reserved or another short UL portion. The position of GP can be flexible, which can be indicated by DCI or semi-statically configured.

In case, only access link are used in a subframe, multi-subframe scheduling over multiple mini-subframes can be considered. this is illustrated in below.

FIG. 17 shows an example of mini-subframe based sharing between backhaul and access.

It is noted that this operation can be performed at sub-frame group instead of each individual subframe. By applying at subframe group, the GP can be placed at the first and/or end of the subframe (e.g., DL subframe to UL subframe or UL subframe to DL subframe).

It is considerable to deploy common signal which can indicate "GP" location and/or subframe type to indicate the potential number of mini-subframes of DL and UL respectively. It is also considered that GP location may not known to UE where depending on the scheduling, UE utilizes one OFDM symbol or one mini-subframe before the start of any uplink transmission similar to half-duplex operation in LTE. In other words, a UE takes the necessary GP depending on the scheduling. This may complicate the UE behavior in terms of downlink control or downlink monitoring, and may waste UE power consumption. In that sense, it is also considerable to indicate explicitly the GP location and DL/UL type/exact format.

II-1. Example Case of Backhaul and Access Link Sharing

To allow dynamic resource sharing between backhaul and access link, one approach is to "reserve" some portion for possible checking on backhaul link data which may or may not be shared with access uplink. To allow dynamic resource sharing between access and backhaul link, at least for relay node, it is necessary to prioritize backhaul link over access link. As backhaul link may or may not have any data destined to a node, it is considerable to allow that each node listens on at least control transmission from backhaul link and schedules access downlink transmission if there is no backhaul transmission/reception.

As it can be further considerable that different numerology between backhaul and access link, the concept can be illustrated as follows.

FIG. 18 shows an example to use different numerology between backhaul and access link.

As shown in the FIG. 18, subframe boundary of access link can be staggered compared to backhaul subframe boundary such that the node can listen on backhaul control transmission. In terms of staggering, two options can be considered. One is to stagger subframe/slot boundaries in a few OFDM symbols. Another approach is to indicate the starting OFDM symbol of control resource set (i.e., starting OFDM symbol of control) and starting OFDM symbol of data where the first few symbols are assumed to be "reserved" which can be activated by UL scheduling or DL scheduling. In other words, the control can start at for example $3^{rd}$ OFDM symbol, and data can start at $4^{th}$ OFDM symbol to the $2^{nd}$ OFDM symbol of the next slot/subframe. In other words, without shifting subframe boundary, by changing the location of control/data, staggering can be also realized. In case, more than one OS (orthogonal symbol) transmission for control transmission is assumed, access subframe can be staggered sufficiently to allow the control channel reception. In case different numerology is used between backhaul and access link, the number of shifted OFDM symbols for access subframe boundary is based on the numerology of access link. For example, if backhaul link uses 15 kHz and access link uses 30 kHz with normal CP (i.e., about 7% CP OH), 2 OS in access link is shifted. If access link uses 7.5 kHz and backhaul link uses 15 kHz, though half-OS with 7.5 kHz is necessary for control channel monitoring, it can stagger 1OS based on access link numerology. Alternatively, it can be based on backhaul numerology. In case propagation delay in backhaul link is non-negligible, staggering should also consider the necessary propagation delay (and possibly DL-UL switching latency).

As a node needs to listen on control OS for backhaul link, the overlapped portion in different subframe may not be used for downlink transmission (unless the network has the simultaneous DL-UL, in which case, staggering may not be necessary), the overlapped portion may be used for GP and/or UL as shown in FIG. 19. In case, the node can handle access UL and backhaul reception, it can indicate the overlapped portion as 'UL'. Otherwise, it can configure the region as 'GP'. This implies that in every 'K' subframe where K is defined by the subframe ratio between backhaul and access link (in case 1 subframe of backhaul corresponds to 2 subframe of access link, K=2), the network needs to configure "semi-static" or "dynamic" GP region as shown in FIG. 19.

More generally, assuming any different usage scenario/ numerology can be multiplexed dynamically in mini-subframe level of access link as shown in FIG. 18, one approach to multiplex backhaul subframe and access link is illustrated in FIG. 20.

In this case, DL burst and UL burst can be indicated at mini-subframe level. If possible backhaul transmission links are configured semi-statically, unusable mini-subframes can be also configured for access link semi-statically. For example, in every K subframe, the first or the last mini-subframe is assumed as "non-usable" mini-subframes. The K value can be configurable depending on possible backhual subframe occasions. In case K>=1, it means that in every K subframe of access link, there could be some reserved mini-subframe for backhaul monitoring. In case backhaul link does not have any data transmission, access link can be used in that subframe. Otherwise, the subframe is used for backhaul link. In case K<1, the reserved portion can be present K times within a subframe. As there are m mini-subframes in a subframe, a UE may monitor/reserve the resource for backhaul link in every floor(m/K) mini-subframes. In case backhaul link subcarrier spacing is larger than access link, the size of mini-subframe can be 1 or 2 OS based on access link numerology. In case backhaul link subcarrier spacing is smaller than access link, the size of mini-subframe can be 2 or 14 OS. Alternatively, the size of mini-subframe can be determined based on backhaul link numerology following the similar rule. Also, to consider both downlink and uplink control portions of access link, the difference or the amount of staggering can be determined based on both numerologies. In the case of FIG. 20, 2 mini-subframes or 2 OS of backhaul link can be staggered which will allow both downlink and uplink control portions would not be affected. The gap between DL data to UL can absorb the resource used for backhaul link.

When staggering is used with subframe boundary shift, it is necessary to consider symbol level alignment between two numerologies which will lead also "staggering" of OFDM symbols with longer CP compared to other OFDM symbols. For example, if one OS duration of a backhaul subframe is staggered for access link, the first OS of the backhaul link in each slot of backhaul subframe would be corresponding to "$13^{th}$ and $14^{th}$ OFDM symbol" of access link subframe. To align symbol level, longer CP can be used in 13th OFDM symbol when 1 OS is staggered. In case 2 OS of backhaul subframe is staggered, 11th OFDM symbol can use the longer CP. Alternatively, longer CP can be evenly distributed OFDM symbols of access link subframe corresponding to backhaul subframe longer CP OFDM symbol(s).

In terms of base numerology between backhaul and access link, either one can be assumed. Though, numerology for backhaul link is generally assumed as base numerology. The idea of numerology alignment is to take longer CP to OFDM symbol(s) corresponding to longer CP OFDM symbol(s) of the base numerology, either by evenly distributing to multiple OFDM symbols or by allocating all remaining CPs to one symbol. However, considering switching of DL-UL at eNB and possibly propagation delay, still longer CP can be added at the first symbol of access link's subframe. In that case, more GP symbols at access link to support backhaul link control data reception may be necessary. Considering potential DL-UL switching at eNB, one more symbol may be treated for GP as shown in FIG. 22 where mini-subframe of a backhaul link is staggered for access link.

Backhaul link can also use extended CP while utilizing larger subcarrier spacing to minimize the transmission time and thus allow more time for access link. In such a case, backhaul link may use extended CP or longer CP compared to access link. In such a case, even though subcarrier spacing is the same, more than OS for control channel reception would be necessary. In addition, to handle possible propagation delay and DL-UL switching, at least one mini-subframe of access link is assumed to be reserved/not-used for access link to handle backhaul control channel monitoring. In such a case, K can be 1. FIG. 22 illustrates this example.

This can be also applied to the case of same numerology between backhaul and access link.

More generally, access link can change DL, UL or GP in each mini-subframe dynamically. In GP region, it can be used for backhaul link or some other purpose (e.g., reserved for future use).

The embodiments illustrated above may be implemented by various instruments. For example, the embodiments of the present invention may be implemented by hardware, firmware, software, or combinations thereof, which will be described in detail with reference to FIG. 9.

FIG. 23 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method performed by a wireless device in a wireless communication system, the method comprising:
identifying a protected resource configured for the wireless device, wherein the wireless device is configured with a full duplex of a downlink (DL) reception and an uplink (UL), transmission wherein the protected resource is a first part of resources in a carrier spectrum in which a non-full duplex device is to perform a DL reception;
receiving a configuration of a first power for the protected resource and a second power for a second part of the resources other than the first part, wherein the first power is lower than the second power;
performing, based on the full duplex, a UL transmission with the first power in the protected resource while performing a DL reception in the protected resource;
performing, based on the full duplex, a UL transmission with the second power in the second part of the resources while performing a DL reception in the second part of the resources;
performing, based on the full duplex, a uplink control information (UCI) transmission with an orthogonal frequency division multiplexing (OFDM) waveform while performing a DL reception with the OFDM waveform; and
performing, based on the full duplex, a UL transmission other than the UCI transmission with a single carrier frequency division multiplexing (SC-FDM) waveform while performing a DL reception with the OFDM waveform.

2. The method of claim 1, wherein the wireless device coexists with a long term evolution (LTE)/LTE-advanced technology based user equipment (UE), and
wherein the wireless device uses semi-static DL/UL configuration where at least some subset of DL and UL of a LTE time division duplex (TDD DL/UL configuration are configured in an adjacent frequency band to the LTE/LTE-advanced technology based UE.

3. The method of claim 1, wherein protected resource is flexibly configured per subframe.

4. The method of claim 1, wherein the second part of the resources consists of all of the resources other than the first part.

5. A wireless device configured to operate in a wireless communication system, the wireless device comprising:
a memory;
a transceiver; and
at least one processor operatively coupled to the memory and the transceiver,
wherein the at least one process is configured to:
identify a protected resource configured for the wireless device, wherein the wireless device is configured with a full duplex of a downlink (DL) reception and an uplink (UL) transmission, wherein the protected resource is a first part of resources in a carrier spectrum in which a non-full duplex device is to perform a DL reception;
control the transceiver to receive a configuration of a first power for the protected resource and a second power for a second part of the resources other than the first part, the first power being lower than the second power,
perform, based on the full duplex, a UL transmission with the first power in the protected resource while performing a DL reception in the protected resource,
perform, based on the full duplex, a UL transmission with the second power in the second part of the resources while performing a DL reception in the second part of the resources,
perform, based on the full duplex, a uplink control information (UCI) transmission with an orthogonal frequency division multiplexing (OFDM) waveform while performing a DL reception with the OFDM waveform, and perform, based on the full duplex, a UL transmission other than the UCI transmission with a single carrier frequency division multiplexing (SC-FDM) waveform while performing a DL reception with the OFDM waveform.

6. The wireless device of claim 5, wherein the wireless device coexists with a long term evolution (LTE)/LTE-advanced technology based user equipment (UE), and wherein the wireless device uses semi-static DL/UL configuration where at least some subset of DL and UL of a LTE time division duplex (TDD) DL/UL configuration are configured in an adjacent frequency band to the LTE/LTE-advanced technology based UE.

7. The wireless device of claim 5, wherein the protected resource is flexibly configured per subframe.

8. The wireless device of claim 5, wherein the second part of the resources consists of all of the resources other than the first part.

* * * * *